United States Patent [19]
Taguchi et al.

[11] Patent Number: 5,915,025
[45] Date of Patent: Jun. 22, 1999

[54] DATA PROCESSING APPARATUS WITH SOFTWARE PROTECTING FUNCTIONS

[75] Inventors: Masahiro Taguchi; Kenji Kawano; Kazuo Saito, all of Nakai-machi, Japan

[73] Assignee: Fuji Xerox Co., Ltd., Tokyo, Japan

[21] Appl. No.: 08/779,643

[22] Filed: Jan. 15, 1997

[30]   Foreign Application Priority Data

Jan. 17, 1996  [JP]  Japan ................................. 8-005559
Jun. 26, 1996  [JP]  Japan ................................. 8-165637

[51] Int. Cl.[6] ....................................................... H04L 9/00
[52] U.S. Cl. ................................ 380/44; 380/4; 380/9; 380/21; 380/46; 380/49; 380/50; 395/186
[58] Field of Search .......................... 380/4, 9, 21, 28, 380/44, 45, 46, 47, 49, 250; 395/186, 187.01

[56]   References Cited

U.S. PATENT DOCUMENTS

| | | | |
|---|---|---|---|
| 4,593,384 | 6/1986 | Kleijne . | |
| 4,747,139 | 5/1988 | Taaffe ........................................ | 380/44 |
| 5,337,357 | 8/1994 | Chou et al. ................................ | 380/4 |
| 5,757,907 | 5/1998 | Cooper et al. ............................. | 380/4 |

FOREIGN PATENT DOCUMENTS

| | | |
|---|---|---|
| A-63-124153 | 5/1988 | Japan . |
| A-2-44447 | 2/1990 | Japan . |
| A-2-155034 | 6/1990 | Japan . |
| A-4-102920 | 4/1992 | Japan . |

*Primary Examiner*—Bernarr E. Gregory
*Attorney, Agent, or Firm*—Oliff & Berridge, PLC

[57]   ABSTRACT

A data processing apparatus with software protecting functions capable of enhancing the level of encryption security independently of the memory management method of the system comprising the apparatus. Upon receiving target data to be encrypted, an encryption key generation unit generates an encryption key in accordance with an attribute of the target data. Using the encryption key, an encryption unit encrypts the target data. The encrypted data is placed into a storage unit. When a request is made to process the encrypted data, a decryption key generation unit generates a decryption key in accordance with the attribute of the encrypted data. A decryption unit decrypts the encrypted data using the decryption key. The decrypted data is processed by a processing unit. A control unit supplies the encryption unit with the data processed by the processing unit as data to be encrypted.

19 Claims, 32 Drawing Sheets

Fig. 11

| Key identifier 59a | Key life 59b | Elapsed time 59c | Update flag 59d |
|---|---|---|---|
| 0 | 10 minutes | 1 minute | 0 |
| 1 | 60 minutes | 30 minutes | 0 |
| 2 | 60 minutes | 61 minutes | 1 |

DATA PROCESSING APPARATUS WITH SOFTWARE PROTECTING FUNCTIONS

BACKGROUND OF THE INVENTION

1. Field of the Invention

The present invention relates to a data processing apparatus with software protecting functions for protecting programs and data handled by the apparatus from being stolen, tampered with, or otherwise abused. More particularly, the invention relates to a data processing apparatus having versatile, general-purpose functions of software protection.

2. Description of the Related Art

Programs and data (generically called data hereunder unless otherwise noted) prepared for public distribution need to be protected from theft, tampering and other unauthorized uses. Conventional attempts to protect the data include placing them into a ROM or storing them on a floppy disk or the like protected against piracy. These attempts have mostly failed to achieve their purpose because determined rogues have easily cracked the safeguards to get what is supposed to be protected.

Other methods of data protection include encrypting the data to be supplied so that only the user having an appropriate decryption key may decrypt the data in question. However, it is impossible for this method completely to eliminate the possibility of the decrypted data being subsequently stolen, tampered with or otherwise abused because they are stored in memory or in fixed disk drives after decryption.

One solution to such problems is a data processing apparatus with security functions proposed in Japanese Unexamined Patent Publication No. Hei 2-155034. The proposed apparatus operates under a scheme whereby encrypted data are again ciphered when placed in internal memory and then deciphered when retrieved therefrom and executed by a central processing unit. The scheme involves installing an encryption and a decryption device for software protection within the data processing apparatus. This apparatus will now be described more specifically below.

FIG. 32 is a block diagram of a conventional data processing apparatus designed for such software protection. The apparatus comprises a central processing unit (CPU) 210, a storage device 240, an input device 220, an output device 230 and a key input device 250. The CPU 210 contains an arithmetic unit 212, a control unit 211, an encryption-decryption unit 213 and a key storage unit 214.

The CPU 210 functions as the core of the data processing apparatus, operating on data and controlling component devices. The storage device 240 for data storage exchanges data with the encryption-decryption unit 213 in the CPU 210 under control of the latter.

The input device 220 receives data from outside the data processing apparatus under control of the CPU 210. The output device 230, also controlled by the CPU 210, outputs data from the data processing apparatus. The key input device 250 sets keys necessary for encrypting and decrypting data.

The arithmetic unit 212 in the CPU 210 performs arithmetic and logic operations on the data fed from the input device 220 or storage device 240. The control unit 211 interprets instructions from the storage device 240 to control the data processing apparatus itself. The key storage unit 214 accommodates keys set by the key input device 250. The encryption-decryption unit 213, interposed between the storage device 240 and the arithmetic unit 212, decrypts the encrypted instructions and data from the storage device 240 by use of keys in the key storage unit 214 in such a manner that the decrypted instructions and data may be interpreted and processed by the control unit 221 and the arithmetic unit 212, respectively. In addition, upon storing the computed result from the arithmetic unit 212 into the storage device 240, the encryption-decryption unit 213 encrypts the target data using keys from the key storage unit 214 and stores it in the storage device 240.

The data processing apparatus of the above-described constitution keeps the data encrypted in the storage device 240. This means that any data stolen from the storage device 240 are difficult to interpret, whereby data security is supposed to be enhanced.

In the above kind of data processing apparatus with software protecting functions, encrypted and stored data need to be decrypted whenever they are executed. This requires the apparatus to adopt a cipher system of relatively simple algorithms (e.g., XOR) in view of the need to reduce the overhead of data decryption. The result can be a lowered level of encryption security. It is thus necessary to maximize the security of data encryption even in conjunction with relatively simple algorithms.

Efforts to bypass the above deficiency include employing different encryption method for each data processing apparatus and to keep such encryption methods confidential. These methods lead to another problem: a significant decrease in data interchangeability. Moreover, the frequency of specific instruction codes appearing in programs and the correspondence of encrypted programs to how the apparatus operates can give clues to how encryption algorithms and encryption keys are constituted. This means that the efforts such as those above have not necessarily increased the level of encryption security for individual data processing apparatuses.

Other methods are being proposed to ensure high levels of encryption security with small amounts of computations involved. One such method is proposed in connection with the data processing apparatus disclosed in Japanese Unexamined Patent Publication No. Hei 4-102920 in which an encryption key is set for each process or segment. In this setup, as with the example of FIG. 32, data are encrypted and stored in memory and are subsequently retrieved therefrom and decrypted for execution by the CPU. In addition, the proposed setup comprises a selection circuit for selecting a translation (i.e., encryption-decryption) circuit for each process or segment. The selection circuit is designed so that plain or user-created programs are carried out by the CPU without the intervention of a translation circuit. This makes it possible to use different encryption keys for each of the processes or segments that constitute the logical units managed by the operating system. With the operating system managing encryption keys in a flexible manner, the level of encryption security is enhanced.

Recently marketed data processing apparatus, especially microprocessors, are characterized by their extensive use of cache memory. In such apparatuses, the translation circuits may be installed interposingly between cache memory and main memory. Decrypted programs and data are then held in cache memory so that encryption and decryption processes will be carried out at high speed.

The above data processing apparatus in which encryption keys are set for each process or segment still has a disadvantage. To control the selection circuit in the logical units of processes or segments requires that the operating system, which the controls processes or segments, be in charge of controlling the selection circuit. The operating system is generally software which, when running under a scheme adopting an encryption method of relatively simple algorithms, can be easily tampered with by those who concentrate on deciphering encryption switchover controls of the operating system. This means that data can be output from the data processing apparatus as they are decrypted therein. Merely tampering with the operating system in part can thus lead to the decryption of all programs and data. That is, control of encryption-decryption means by software in a data processing apparatus can be a weak point in data security.

A system in which the selection circuit is controlled by the operating system and in which decrypted data are held in cache memory for high-speed processing can entail the following problems:

Cache memory control methods fall into two broad categories: a write-through method whereby data in cache memory and those in main memory are updated synchronously, and a write-back method whereby the two kinds of data in the two memories are updated asynchronously. The write-back method is generally the more efficient of the two methods, and should preferably be used for cache memory control so that the data processing apparatus in question may carry out data encryption and decryption without sacrificing its performance.

Where the write-back type cache memory setup is adopted, the fact that data in cache memory and those in main memory are updated asynchronously means that software can control only the timing of writing data to cache memory. As a result, control of the selection circuit by software becomes impossible. In other words, having the operating system control the selection circuit prevents decrypted data from being retained in write-back type cache memory. To enhance the level of encryption security without reducing processing capabilities requires implementing an encryption-decryption key management scheme matching various memory management methods such as the cache memory method and virtual storage method.

Furthermore, conventional data processing apparatuses with software protecting functions use a predetermined decryption method or decryption keys in decrypting the programs or data encrypted by a predetermined encryption method or encryption keys. The overhead accompanying the process of decryption requires that the encryption method be relatively simple so that the amount of computations involved is limited. This makes it necessary for the encryption-decryption method or encryption-decryption keys to be confidential or be specific to each data processing apparatus. Any third party not in a position to know such encryption-decryption methods or keys is unable to freely develop software which should be protected by the security function of the data processing apparatus in question.

SUMMARY OF THE INVENTION

It is therefore an object of the present invention to overcome the above-described drawbacks and disadvantages of the prior art and to provide a data processing apparatus having software protecting functions ensuring high levels of encryption security independently of the memory management method of the apparatus.

FIG. 1 is a schematic view illustrating the principles of the present invention. In carrying out the invention and according to one aspect thereof, there is provided, as shown in FIG. 1, a data processing apparatus with software protecting functions, comprising: encryption key generation means 1 for generating an encryption key 1a depending on an attribute of data to be encrypted; decryption key generation means 2 for generating a decryption key 2a depending on an attribute of encrypted data; encryption means 3 for encrypting data to be encrypted by use of the encryption key 1a generated by the encryption key generation means 1; storage means 4 for storing encrypted data 4a from the encryption means 3; decryption means 5 for decrypting the encrypted data 4a in the storage means 4 by use of the decryption key 2a generated by the decryption key generation means 2; processing means 6 for processing data decrypted by the decryption means 5 in accordance with instructions included in the decrypted data; and control means 7 for outputting processed data from the processing means 6 to the encryption means 1 as data to be encrypted.

With the data processing apparatus of the above constitution, the encryption key generation means 1 upon receiving data to be encrypted generates the encryption key 1a in accordance with the attribute of the target data. Using the encryption key 1a, the encryption means 3 encrypts the target data. The encrypted data 4a is placed into the storage means 4. When a request is made to process the encrypted data 4a, the decryption key generation means 2 generates the decryption key 2a in accordance with the attribute of the encrypted data 4a. The decryption means 5 decrypts the encrypted data 4a using the decryption key 2a. The decrypted data is processed by the processing means 6. The control means 7 supplies the encryption means 3 with the data processed by the processing means 6 as data to be encrypted.

In the manner described, the encryption and decryption keys are generated according to the attribute of the data to be encrypted and decrypted. Because different keys are used for different data attributes, the inventive data processing apparatus with software protecting functions enhances the level of encryption security independently of the memory management method of the system comprising the apparatus.

According to another aspect of the invention, there is provided a data processing apparatus with software protecting functions, comprising: key supply means for supplying a plurality of keys used for encryption and decryption; algorithm supply means for supplying a plurality of pieces of algorithm information expressing algorithms for encryption and decryption; encryption-decryption method selection means for selecting an encryption key and encryption algorithm information respectively from among the plurality of keys and the plurality of pieces of algorithm information supplied for encryption, and selecting a decryption key and decryption algorithm information respectively from among the plurality of keys and the plurality of pieces of algorithm information supplied for decryption; encryption means for encrypting data to be encrypted by use of the encryption key and encryption algorithm information selected by the encryption-decryption method selection means; storage means for storing encrypted data from the encryption means; decryption means for decrypting the encrypted data in the storage means by use of the decryption key and decryption algorithm information selected by the encryption-decryption method selection means; processing means connected directly to the decryption means so as to process data decrypted by the decryption means in accordance with instructions included in the decrypted data; and control means for outputting processed data from the processing means directly to the encryption means as data to be encrypted.

With the data processing apparatus of the above constitution, the encryption-decryption method selection means selects an encryption key and encryption algorithm information respectively from among the plurality of keys and the plurality of pieces of algorithm information supplied for encrypting the target data to be encrypted. Using the encryption key and algorithm thus selected, the encryption means encrypts the target data. The encrypted data is placed into the storage means. When the encrypted data in the storage means is to be decrypted, the encryption-decryption method selection means selects a decryption key and decryption algorithm information from among the plurality of keys and the plurality of pieces of algorithm information supplied for decryption. Using the selected decryption key and algorithm, the decryption means decrypts the encrypted data from the storage means. The processing means processes the decrypted data from the decryption means in accordance with the instructions included in the data. The control means outputs the data thus processed to the encryption means as data to be encrypted.

The setup above allows keys and algorithms to be changed depending on the data attributes upon encryption and decryption. Given this capability, the data processing apparatus of the invention provides higher levels of encryption security than conventional systems changing keys only.

These and other objects, features and advantages of the invention will become more apparent upon a reading of the following description and appended drawings.

BRIEF DESCRIPTION OF THE DRAWINGS

FIG. 11 is a view of a typical time management table;

DESCRIPTION OF THE PREFERRED EMBODIMENTS

Figure 1:
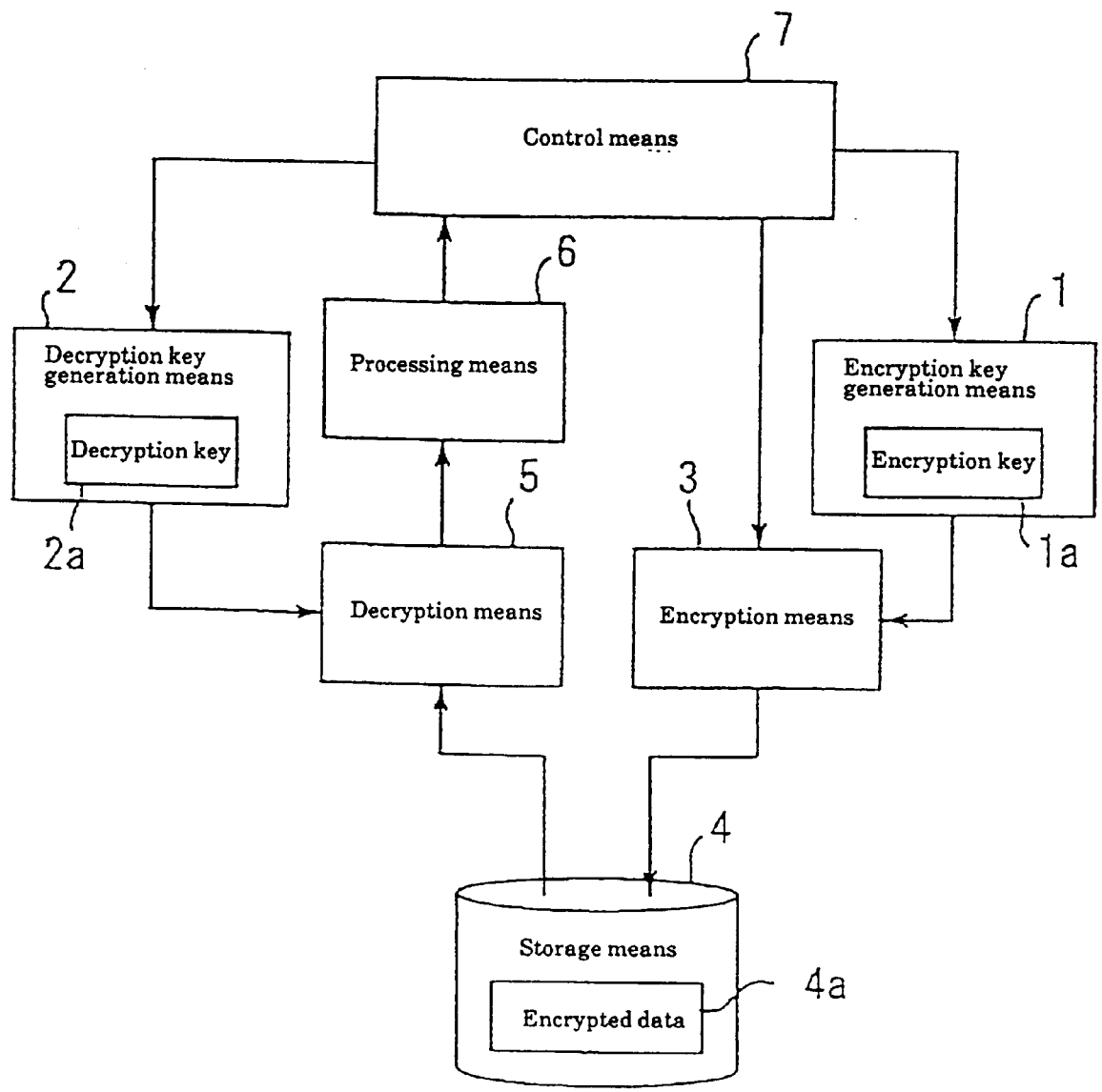
FIG. 1 is a schematic view outlining the operating principles of the present invention.

Preferred embodiments of the present invention will now be described with reference to the accompanying drawings. FIG. 1 is a schematic view sketching the operating principles of the invention. The data processing apparatus with software protecting functions, as outlined in FIG. 1, comprises: encryption key generation means 1 for generating an encryption key 1a depending on an attribute of target data (including both instructions and data) to be encrypted; decryption key generation means 2 for generating a decryption key 2a depending on an attribute of encrypted data; encryption means 3 for encrypting target data to be encrypted by use of the encryption key 1a generated by the encryption key generation means 1; storage means 4 for storing encrypted data 4a from the encryption means 3; decryption means 5 for decrypting the encrypted data 4a in the storage means 4 by use of the decryption key 2a generated by the decryption key generation means 2; processing means 6 for processing data decrypted by the decryption means 5 in accordance with instructions included in the decrypted data; and control means 7 for outputting processed data from the processing means 6 to the encryption means 3 as target data to be encrypted.

With the data processing apparatus of the above constitution, the encryption key generation means 1 upon receiving target data to be encrypted generates the encryption key 1a in accordance with the attribute of the target data. Using the encryption key 1a, the encryption means 3 encrypts the target data. The encrypted data 4a is placed into the storage means 4. When a request is made by the control means 7 to process the encrypted data 4a, the decryption key generation means 2 generates the decryption key 2a in accordance with the attribute of the encrypted data 4a. The decryption means 5 decrypts the encrypted data 4a using the decryption key 2a. The decrypted data is processed by the processing means 6. The control means 7 supplies the encryption means 3 with the data processed by the processing means 6 as target data to be encrypted.

In the manner described, the encryption and decryption keys are determined according to the attribute of the target data to be encrypted and decrypted. Because data with different attributes are encrypted and decrypted by different keys, the inventive apparatus ensures that encrypted data have high levels of encryption security. In the above context, attributes refer to various kinds of information related to the data in question, such as data addresses, address regions, virtual addresses and segments.

Figure 2:
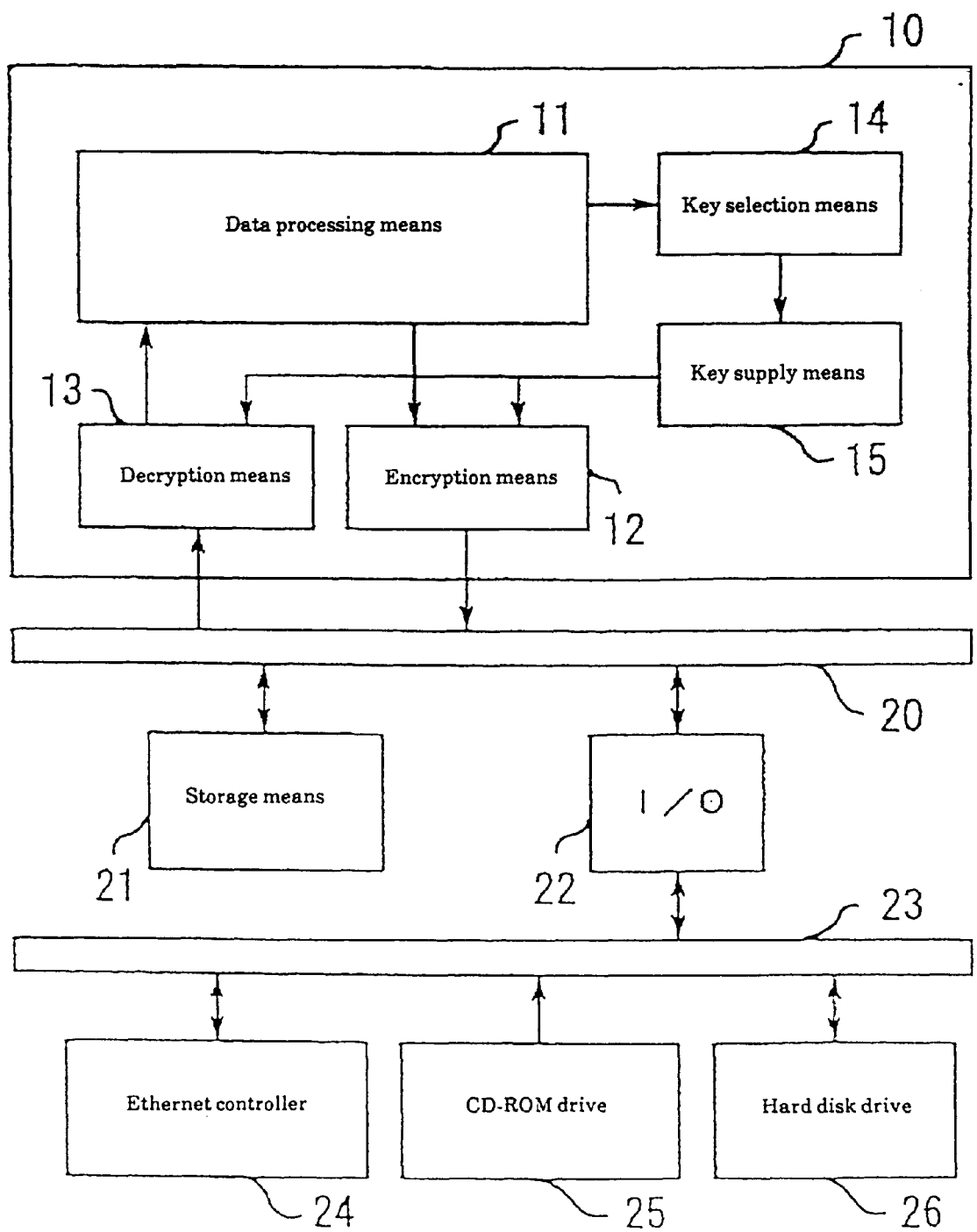
FIG. 2 is a block diagram of a typical hardware constitution of a data processing apparatus with software protecting functions practiced as an embodiment of the invention.

Below is a more specific description of a data processing apparatus with software protecting functions practiced as an embodiment of the invention. FIG. 2 is a block diagram of a typical hardware constitution of such a data processing apparatus with software protecting functions. The data processing apparatus primarily comprises data processing means 11 which is an MPU (micro-processing unit) for computing data and controlling memory access; encryption means 12 for encrypting data output by the data processing means 11; decryption means 13 for decrypting encrypted data to be input to the data processing means 11; key selection means 14 for selecting encryption and decryption keys for encryption and decryption, respectively; and key supply means 15 for supplying the encryption means 12 and decryption means 13 with the keys selected by the key selection means 14. These components are housed in a secure protective enclosure 10. The encryption means 12 and decryption means 13 are connected via a system bus 20 to storage means 21 made of a RAM (random access memory) and to an I/O interface 22.

The I/O interface 22 controls data exchanges between the system bus 20 and a peripheral bus 23. The peripheral bus 23 is connected to an Ethernet controller 24 which performs data communication over the Ethernet, a CD-ROM drive 25 for reading data from a CD-ROM, and a hard disk 26 for magnetically writing and reading large amounts of data to and from disks.

In the above constitution, data that has been encrypted by a predetermined encryption method and encryption key is supplied from the network or from the hard disk 26. To have the encrypted data processed by the data processing means 11 requires loading the data into the storage means 21. At this point, information about a key for decrypting the encrypted data is sent to the key selection means 14. The key selection means 14 orders the key supply means 15 to hand a decryption key over to the decryption means 13 and, selecting an encryption key corresponding to the data storage address, tells the key supply means 15 to pass the encryption key on to the encryption means 12. That is, the encrypted program or data is decrypted by the decryption means 13, encrypted again by the encryption means 12 using the encryption key corresponding to the data storage address, and then loaded into the storage means 21. When a program is to be executed, the key selection means 14 orders the key supply means 15 to select a decryption key corresponding to the data storage address and pass the key on to the decryption means 13 for program decryption.

The data processing means 11, encryption means 12, decryption means 13, key selection means 14 and key supply means 15 of the data processing apparatus are housed in a protective enclosure 10. The protective enclosure 10 is designed to protect the components inside against externally initiated probes. Specifically, attempts to dismount or penetrate the protective enclosure 10 will cause the components inside to stop their operation or to delete confidential data they handle. This provides a virtually perfect shield against theft or tampering of the encryption-decryption methods, encryption and decryption keys or decrypted data. All components that may carry decrypted data must be located inside the protective enclosure 10. The protective enclosure is also called a tamper-resistant module, some examples of which are discussed illustratively in U.S. Pat. No. 4,593,384, Japanese Unexamined Patent Publication No. Sho 63-124153 and Japanese Unexamined Patent Publication No. Hei 2-44447.

Such secure protective enclosures include materials surrounding the circuits that handle confidential information, the materials being furnished on their surface with conductors and logic elements arranged in a complex maze. If any of the surrounding materials is destroyed tampered with by attempts to gain unauthorized access to confidential information inside, a breakage or short-circuiting of a conductor (s) and/or a malfunction of a logic element(s) will trigger erasure of the confidential information such as encryption keys. This means that when the MPU and encryption-decryption devices handling encryption and decryption keys as well as plain data are housed in the secure protective enclosure, rogues will have few clues to interpreting the encrypted data. The devices for handling encryption and decryption keys as well as plain data should preferably be placed integrally in a single LSI chip. If a plurality of LSI chips are used to accommodate such sensitive devices, the chips may be sealed inside a multi-chip module (MCM) with no chip-to-chip wiring exposed outside. Alternatively, data may be kept confidential in a static RAM (SRAM) backed up by batteries in the enclosure. In this case, the enclosure may be designed so that any attempt to open it will cut off battery power to the SRAM, destroying its contents.

The embodiment above applies where encrypted data sent in over the network or the like is decrypted by use of the same algorithms as those for internal encrypted data. This setup has the disadvantage of having to encrypt externally supplied software to the data processing apparatus using those same algorithms for internal encrypted data which involve only small amounts of computations. In a variation of the above setup, decryption means for decrypting data with more complex algorithms may be separately provided to boost encryption security of the software fed to the data processing unit. This variation will now be described below.

Figure 3:
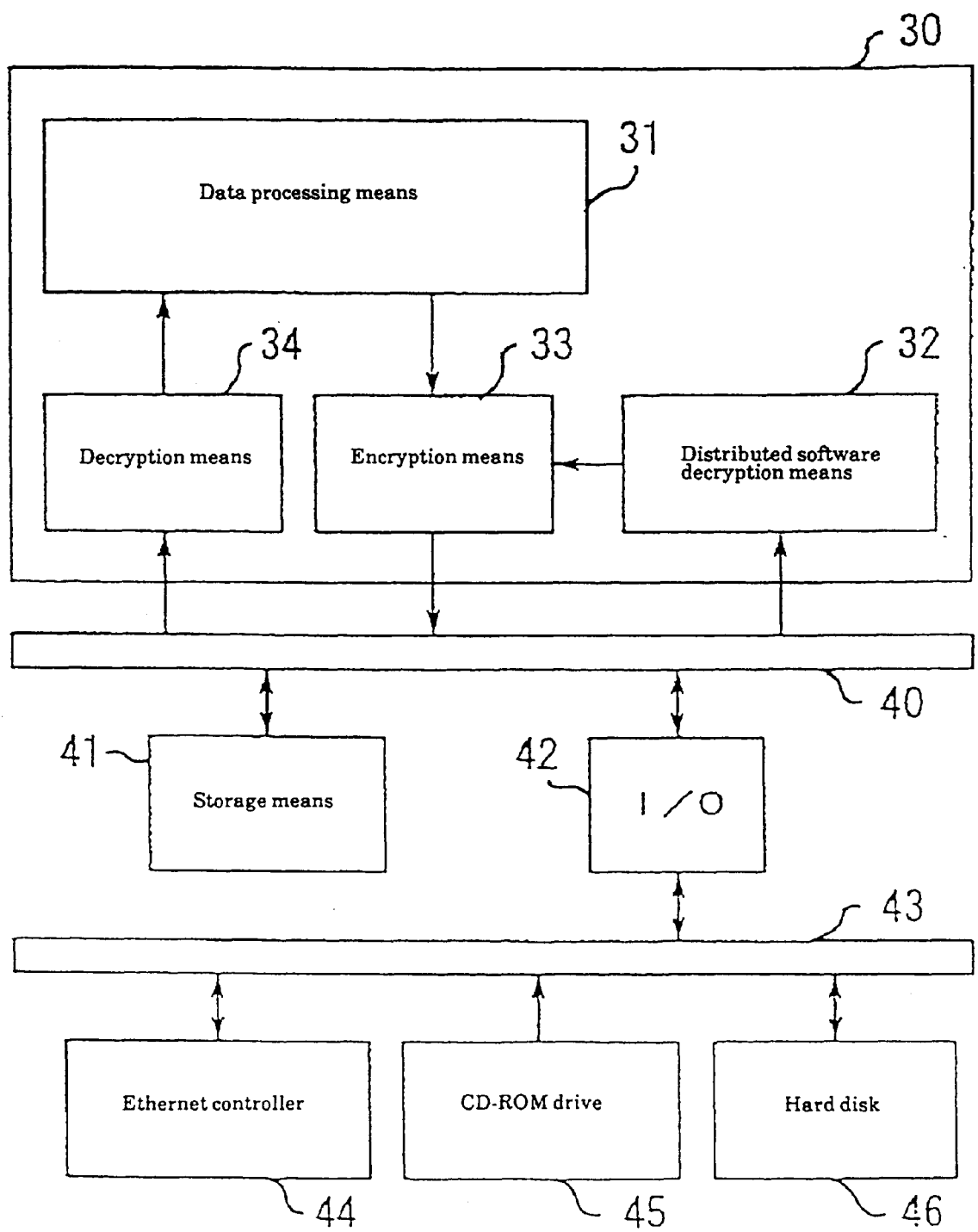
FIG. 3 is a block diagram of a typical hardware constitution of a data processing apparatus with software protecting functions including a plurality of decryption means and practiced as another embodiment of the invention.

FIG. 3 is a block diagram of a typical hardware constitution of a data processing apparatus with software protecting functions including a plurality of decryption means and practiced as another embodiment of the invention. This data processing apparatus comprises data processing means 31 made of an MPU, distributed software decryption means 32, encryption means 33, decryption means 34, and storage means 41 which is a RAM. In addition, the data processing apparatus is connected via an I/O interface 42 to a hard disk 46, a CD-ROM drive 45 and an Ethernet controller 44. The data processing means 31, distributed software decryption means 32, encryption means 33 and decryption means 34 are housed in a secure protective enclosure 30. A system bus 40 interconnects the components in the secure protective enclosure 30, the storage means 41 and I/O interface 42. A peripheral bus 43 interconnects the I/O interface 42, Ethernet controller 44, hard disk 46 and CD-ROM drive 45.

In the above constitution, data is initially encrypted and supplied from software suppliers to users over the network or by means of CO-ROM's and the like. The encryption method used in such cases is any one of well-known encryption methods offering high levels of encryption security. Illustratively, a software supplier may encrypt data for a user by utilizing the DES (Data Encryption Standard, the encryption algorithm disclosed in 1977 by the Standards Bureau, U.S. Department of Commerce, currently the American National Standards Institute). The encrypted data may be offered to the user together with a decryption key that is encrypted illustratively by a public key based on the RSA (Rivest, Shamir, Adleman; the algorithm devised by Ronald Rivest, Adi Shamir and Leonard Adleman) for a data processing apparatus with software protecting functions. The user transfers the encrypted data and the decryption key encrypted by the public key for the data processing apparatus, from the I/O interface 42 to the distributed software decryption means 32 for decryption. The distributed software decryption means 32 decrypts the decryption key by its own RSA secret Key, and subsequently decrypts the encrypted data by the decryption key. The data thus decrypted is sent directly to the encryption means 33 so as to be encrypted by a secret encryption method or encryption key. The user cannot access the decrypted data. The data encrypted by the encryption means 33 is stored into the storage means 41. The data processing means 31 causes the decryption means 34 to decrypt the encrypted data from the storage means 41, receives the decrypted data, and executes instructions included in the data. If any part of the data output by the data processing means 31 needs to be encrypted, that data part is encrypted by the encryption means 33 before being placed into the storage means 41.

The data (i.e., distributed software) encrypted by the open encryption method and encryption key is admitted into the data processing apparatus with software protecting functions, the admitted data being decrypted by the distributed software decryption means 32. It follows that software suppliers need not know the encryption-decryption method or encryption-decryption keys for use by the encryption means 33 and decryption means 34; they need only develop software for use with the data processing means 31. In other words, a third party not in a position to know the encryption-decryption method or encryption-decryption keys in any data processing apparatus with software protecting functions may freely develop software that is protected by the data processing apparatus.

As with the embodiment of FIG. 2, the above embodiment has its important components housed in the secure protective enclosure 30. This setup also protects the sensitive devices inside against externally initiated probes.

Where the data processing apparatus of FIG. 2 is functionally combined with that of FIG. 3, data security is further enhanced. One such example is shown in FIG. 4.

Figure 4:
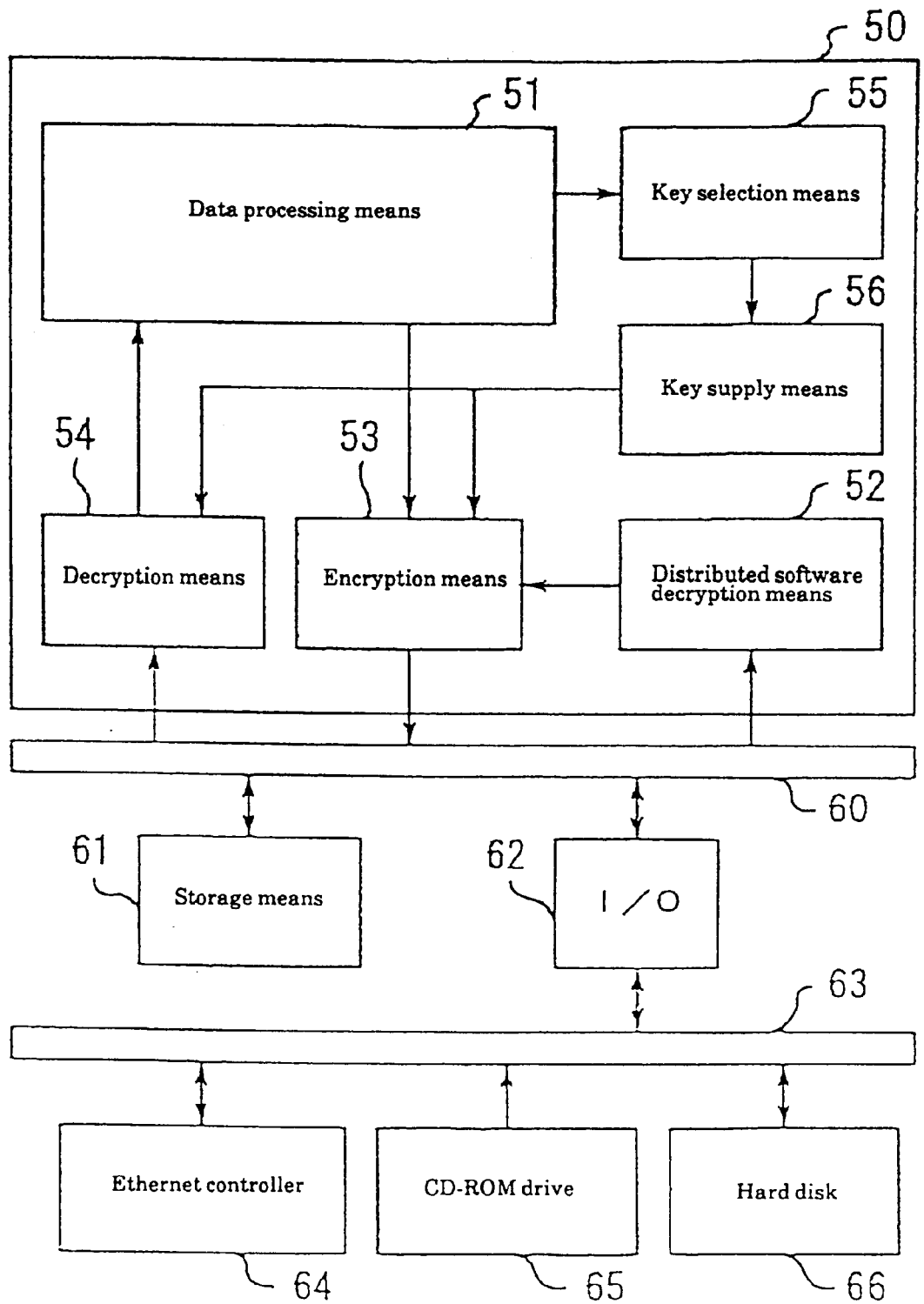
FIG. 4 is a block diagram of a typical hardware constitution of a data processing apparatus with software protecting functions, the apparatus functionally combining the embodiments of FIGS. 2 and 3.

The data processing apparatus of FIG. 4 comprises data processing means 51, distributed software decryption means 52, encryption means 53, decryption means 54, key supply means 56, key selection means 55, storage means 61, an I/O interface 62, a hard disk 66, a CD-ROM drive 65, an Ethernet controller 64, a protective enclosure 50, a system bus 60 and a peripheral bus 63. This data processing apparatus adopts a virtual storage method and manages storage in units of pages.

In the constitution above, the encrypted data and decryption key are supplied over the network or by means of a CD-ROM and the like from a software supplier to the user. To load the encrypted data into the apparatus for execution requires initially that the decryption key encrypted by a public key for the apparatus be sent to the distributed software decryption means 52 via the I/O interface 62. The decrypted data is forwarded directly to the encryption means 53. At the same time, the key selection means 55 selects an encryption key group corresponding to the storage destination page number of the data. The selected encryption key group is fed from the key supply means 56 to the encryption means 53. The data sent to the encryption means 53 is encrypted by the key group supplied by the key supply means 56. Because the encryption method or encryption keys in this case are of secret nature, the user cannot access the decrypted data. The data encrypted by the encryption means 53 using a different encryption key group for each page is placed into the storage means 61. The excess pages not accommodated by the storage means 61 are swapped out to the hard disk 66. Where the data processing means 51 is to execute an encrypted program in the storage means 61, the key selection means 55 first selects from the key supply means 56 a decryption key group corresponding to the data storage destination page. The decryption means 54 then decrypts the data using the selected decryption key group. The program thus decrypted is executed by the data processing means 51. If any part of the data output by the data processing means 51 needs to be encrypted, that data part is encrypted by the encryption means 53 before being placed into the storage means 61.

Figure 5:
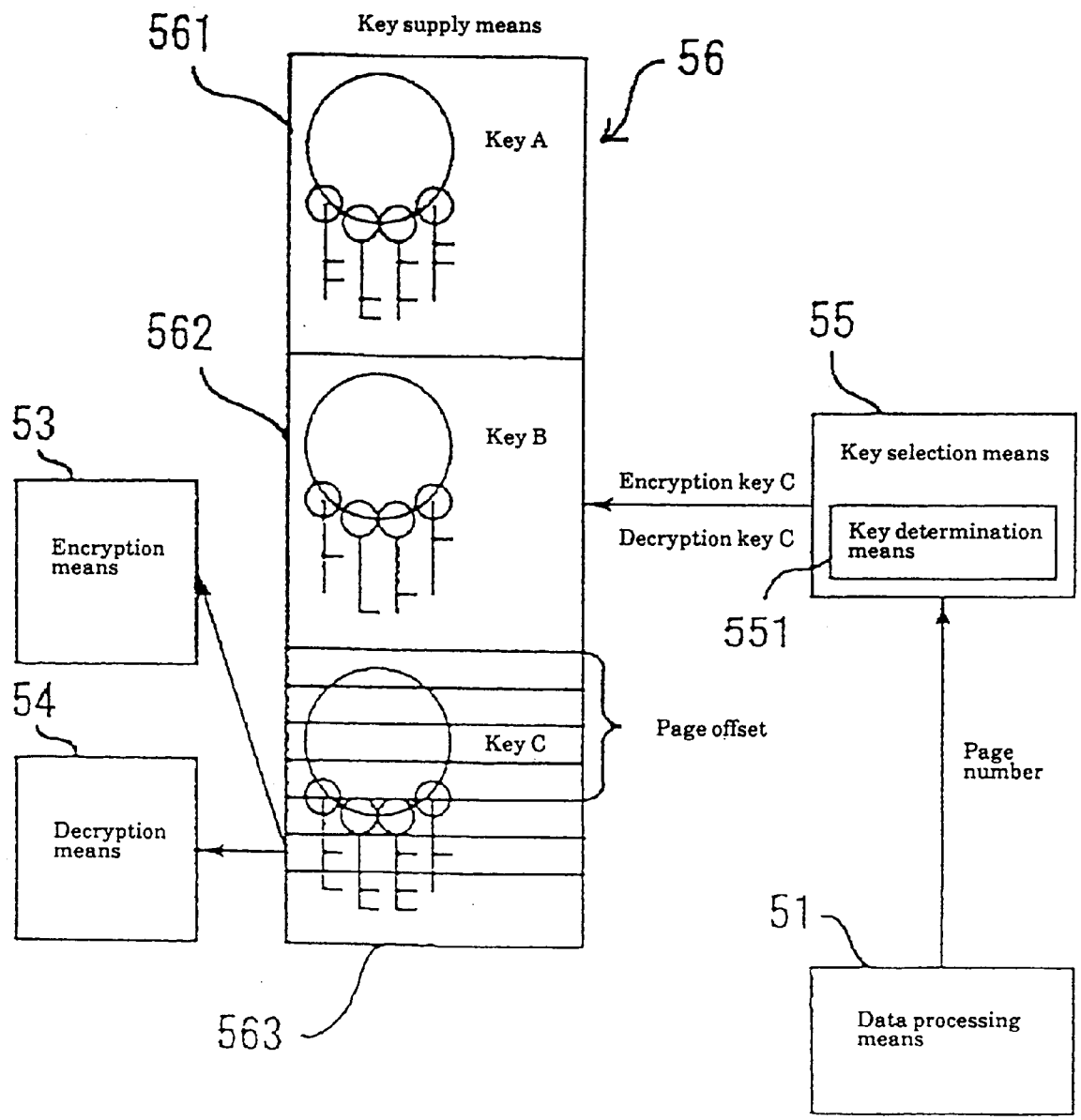
FIG. 5 is a detail view illustrating how a key group is selected by key selection means.

FIG. 5 is a detail view illustrating how a key group is selected by the key selection means 55. The key selection means 55 includes key determination means 551 for determining the key corresponding to the data in each page. The key supply means 56 comprises a plurality of key groups (e.g., group A 561, group B 562, group C 563). Each of the keys in any one key group corresponds to a page offset. When the data processing means 51 outputs the page number of a page to be encrypted or decrypted, the key selection means 55 specifies the key group corresponding to the page number. At this point, the key determination means 551 determines that the key group which corresponds to each block in the page. In this example, the key selection means 55 designates the group C 563. The key supply means 56 supplies the keys of the group C 563 to the encryption means 53 and decryption means 54. The encryption means 53 or decryption means 54 encrypts or decrypts the blocks of the page to be encrypted or decrypted using the individual keys in the supplied key group.

Suppose that a page is made up of 256 bytes and that a data block to be encrypted by a single key is 16 bytes long. In that case, each key group is constituted by up to 16 keys. If each of the bytes making up a page is given an offset address and if the key group includes 16 keys, the key should be used is determined by any four bits of each offset address. Alternatively, any four bits in the data block to be encrypted may be used to determine which encryption or decryption key to use (these four bits taken direct from the program or data are not encrypted).

Figure 6:
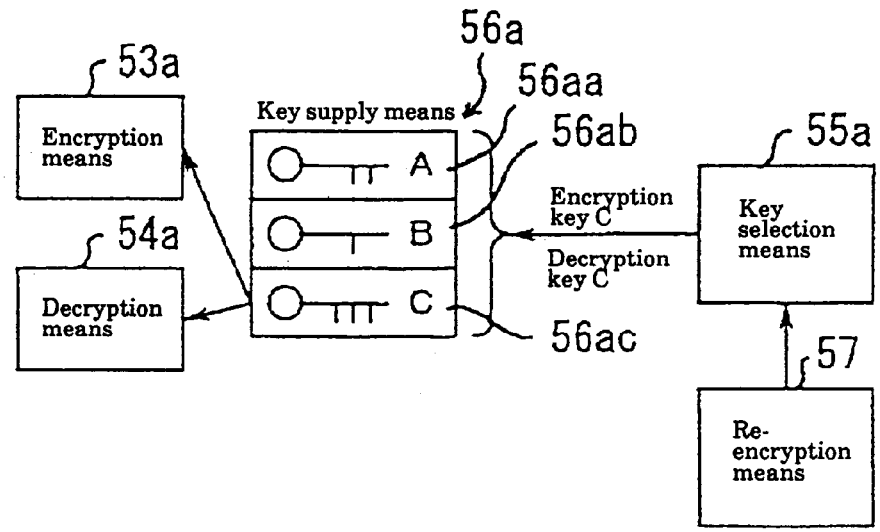
FIG. 6A is a view of a first example of the changing of keys by re-encryption means, the view showing a state in which keys are yet to be changed by the re-encryption means.
FIG. 6B is another view of the first example, showing a state in which a key change command has been output.
FIG. 6C is yet another view of the first example, depicting a state in which all data that needs to be re-encrypted has been re-encrypted.
Figure 6:
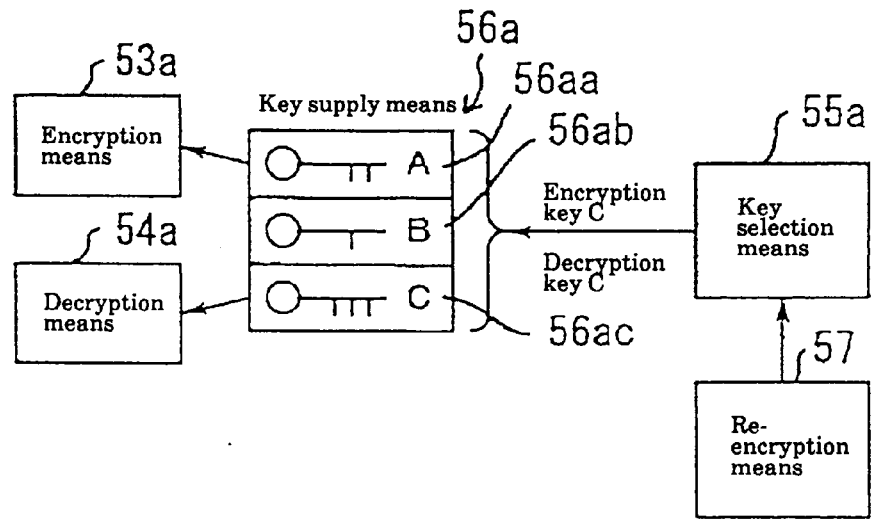
Figure 6:
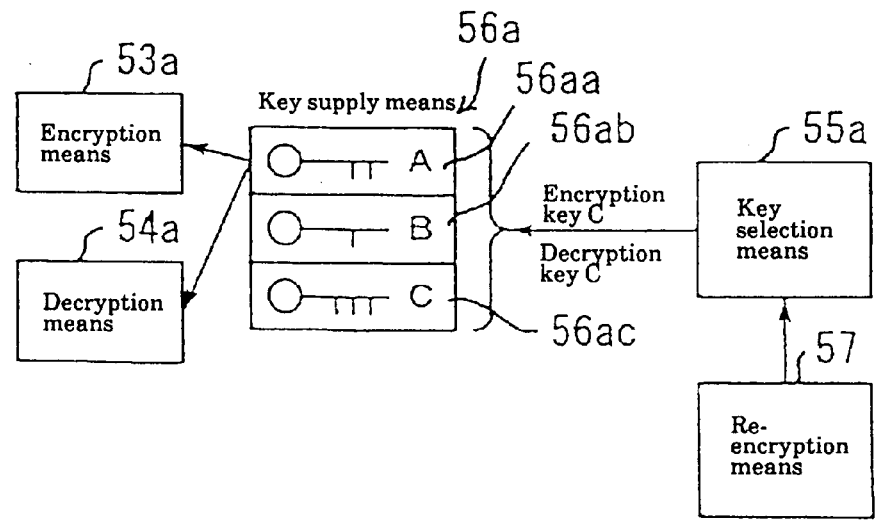

When the procedure above is carried out, a third party not in a position to know the encryption-decryption method or encryption-decryption keys in any data processing apparatus with software protecting functions may freely develop software that is protected by the data processing apparatus. Encryption security is thus enhanced for data and programs to be handled by the data processing apparatus.

Where keys of encrypted data are timed suitably to be changed, encryption security is further enhanced. One such example will now be described below. FIGS. 6A, 6B and 6C are views of a first example of the changing of keys by re-encryption means. For the first example, it is assumed that the same key is used for both encryption and decryption. FIG. 6A is a view of a state in which keys are yet to be changed. In this example, the key supply means 56a contains three keys: key A 56aa, key B 56ab and key C 56ac. The key selection means 55a selects the key C 56ac for both encryption and decryption. Thus the encryption means 53a and decryption means 54a are both fed with the key C. At this point, the re-encryption means 57 outputs a key change command to the key selection means 55a. It is assumed here that a key change command is output at predetermined intervals. In practice, the re-encryption means 57 is implemented by the data processing means executing a program loaded in main memory. Alternatively, the data processing means may order a DMAC (direct memory access controller) to implement the re-encryption capability in accordance with a program.

FIG. 6B is a view of a state in which a key change command has been output. When a key change command is output past a certain period following the preceding command, the key selection means 55a selects the key A in place of the current key C under control of the re-encryption means 57. In this state, the data that was encrypted by the key C in the storage means is decrypted, and the decrypted data is again encrypted by the key A before being placed again into the storage means. In this manner, the current encryption key C is replaced with the key A and the data is re-encrypted by the latter key.

FIG. 6C is a view of a state in which all data that needs to be re-encrypted has been re-encrypted. When the data that was encrypted by the key C has all been re-encrypted by the key A, the re-encryption means 57 orders the key selection means 55a to select the key A for decryption. The key selection means 55a changes keys as ordered, and the key supply means 56a hands the key A over to the decryption means 54a.

Figure 7:
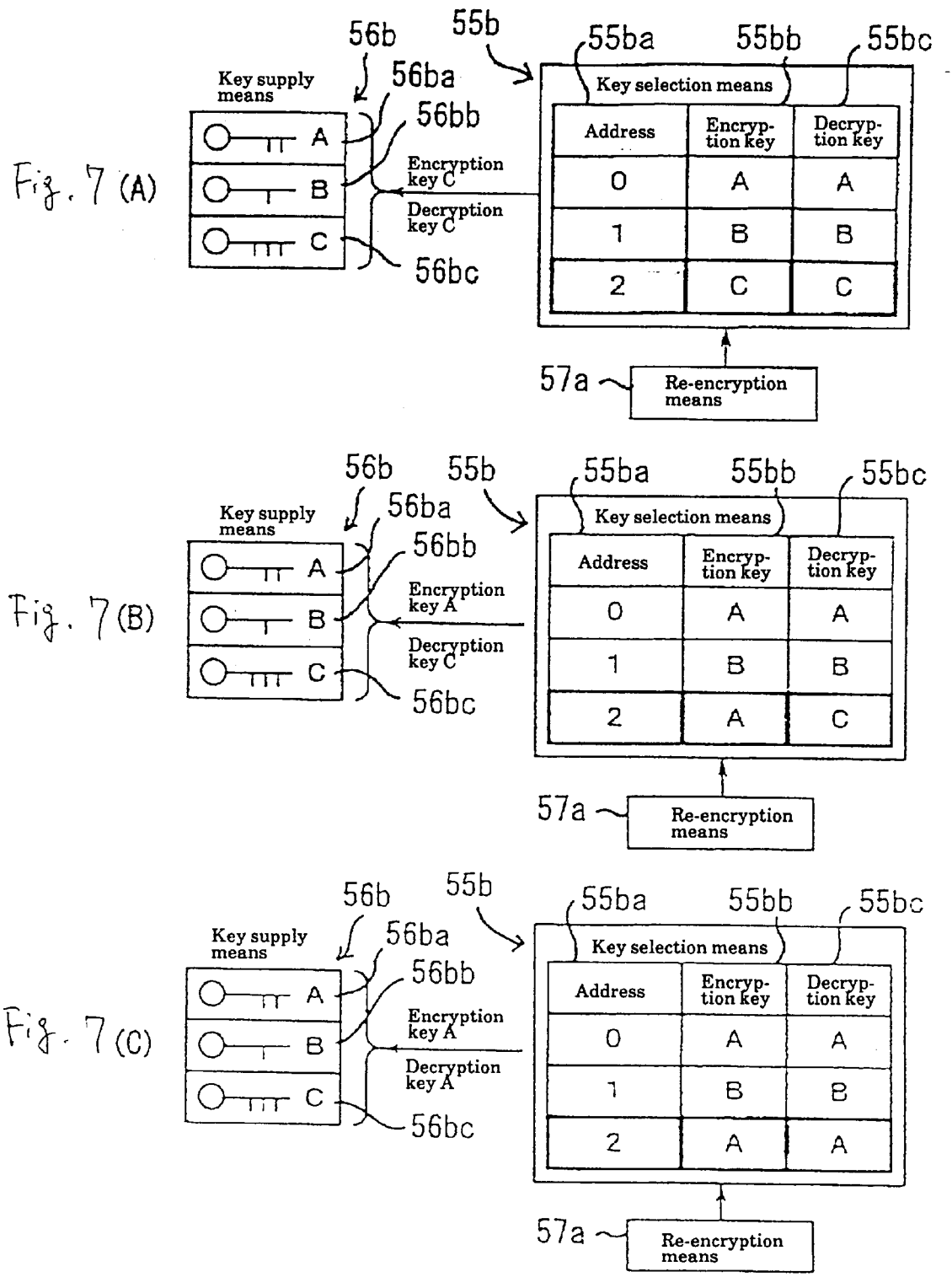
FIG. 7A is a view of a second example of key change by the re-encryption means, the view showing a state in which keys are yet to be changed by the re-encryption means.
FIG. 7B is another view of the second example, indicating a state in which a key change command has been output.
FIG. 7C is yet another view of the second example, depicting a state in which all data that needs to be re-encrypted has been re-encrypted.

Because the key selection means 55 changes keys dynamically under control of the re-encryption means 57 as described, encryption security is enhanced. It should be noted that the encryption-decryption key or encryption-decryption key group used for the data processing apparatus operation need not be limited to a single key or key group supplied by the key supply means 56. Alternatively, a plurality of keys or key groups may be used all at once for the data processing apparatus operation. FIGS. 7A, 7B and 7C are views of a second example of key change by the re-encryption means. For the second example, it is assumed that the same keys are also used for both encryption and decryption. FIG. 7A is a view of a state in which keys are yet to be changed. The key supply means 56b may supply three keys: key A 56ba, key B 56bb and key C 56bc. The key selection means 55b has a key management table comprising three columns: an address column 55ba, an encryption key column 55bb and a decryption key column 55bc. The key management table is used to manage the correspondence between addresses and keys. In this example, address 0 corresponds to an encryption key A and a decryption key A, address 1 to an encryption key B and a decryption key B, and address 2 to an encryption key C and a decryption key C. The re-encryption means 57a outputs to the key selection means 55b a data key change command for changing keys regarding data at address 2.

FIG. 7B is a view of a state in which the key change command has been output. Illustratively, where the key C is to be replaced with the key A past a certain period following the preceding command, the re-encryption means 57a substitutes the key A for the current key of address 2 in the key management table of the key selection means 55b. In turn, the key selection means 55b orders the key supply means 56b to hand the encryption key A over to the encryption means while still passing the decryption key C on to the decryption means. In this state, the encrypted data from address 2 in the storage means is decrypted by the decryption key C. The decrypted data is again encrypted by the encryption key A before being placed back to the storage means. In this manner, the current encryption key C is replaced with the encryption key A, and the data at address 2 is re-encrypted by the latter key.

FIG. 7C is a view of a state in which all data that needs to be re-encrypted has been re-encrypted. Upon completion of re-encryption of the data, the re-encryption means 57a replaces the decryption key C with the decryption key A for address 2 in the key management table of the key selection means 55b. Alternatively, in the second example, addresses may be replaced with address regions (e.g., pages or segments), and keys with key groups.

Figure 8:
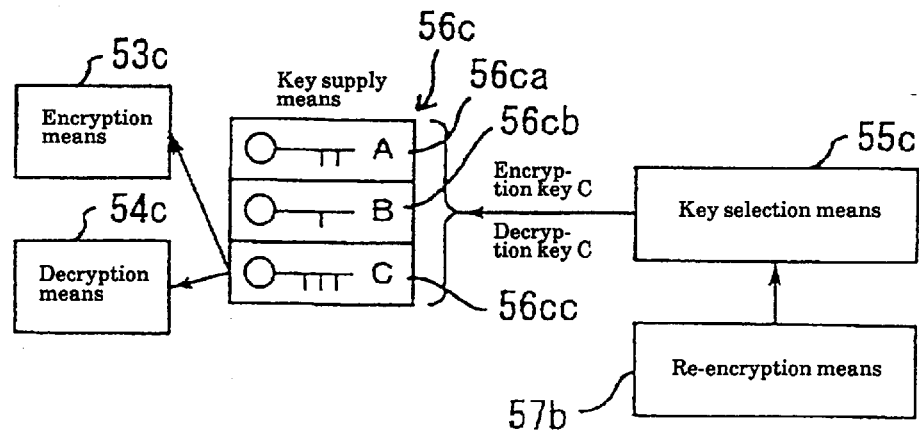
FIG. 8A is a view of an example in which keys of key supply means are changed, the view showing a state in which keys are yet to be changed.
FIG. 8B is another view of the example in which the keys of the key supply means are changed, the view indicating a state in which a key change command has been output.
FIG. 8C is yet another view of the example in which the keys in the key supply means are changed, the view depicting a state in which all data that needs to be re-encrypted has been re-encrypted and a key that needs to be changed has been changed.
Figure 8:
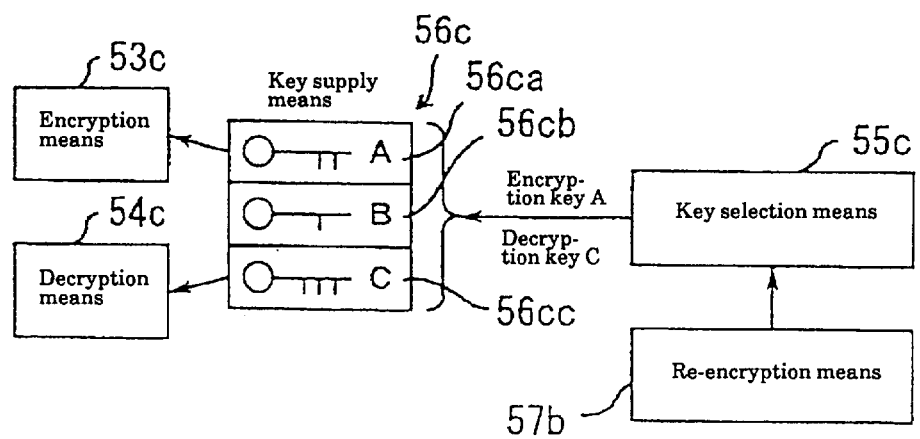
Figure 8:
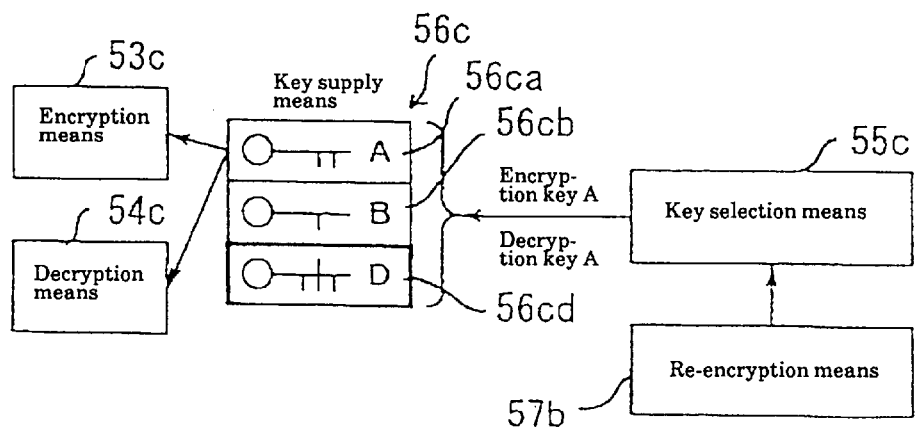

While the above example is shown to have a plurality of keys stored beforehand in the key supply means, the stored keys may be changed in a variation of that example, as will be described below. FIGS. 8A, 8B and 8C are views of an example in which keys in the key supply means are changed. For this example, it is assumed that the same key is used for both encryption and decryption. To change keys in the key supply means requires carrying out the re-encryption procedure such as that described with reference to FIGS. 6A through 6C.

FIG. 8A is a view of a state in which keys are yet to be changed. In this example, the key supply means 56c contains three keys: key A 56ca, key B 56cb and key C 56cc. The key selection means 55c selects the key C 56cc for both encryption and decryption. Thus the encryption means 53c and decryption means 54c are both supplied with the key C 56cc. In this state, the re-encryption means 57b outputs a key change command to the key selection means 55c. It is assumed here that a key change command is output at predetermined intervals.

FIG. 8B is a view of a state in which the key change command has been output. When the key change command is output past a certain period following the preceding command, the key selection means 55c replaces the current key C with the key A under control of the re-encryption means 57b. The key supply means 56c passes the key A on to the encryption means 53c. In this state, the encrypted data in the storage means is decrypted by use of the key C, and the decrypted data is further encrypted by the key A before being placed back to the storage means.

FIG. 8C is a view of a state in which all data that needs to be re-encrypted has been re-encrypted. When all data that was encrypted by the key C has been re-encrypted by the key A, the re-encryption means 57b orders the key selection means 55c to select the key A for decryption. After the key selection means 55c has selected the new decryption key as ordered, the key supply means 56c hands the key A over to the decryption means 54c. The key C 56cc is then replaced with a key D 56cd. The key supply means 56c thus discards the key C and starts supplying the key D.

Figure 9:
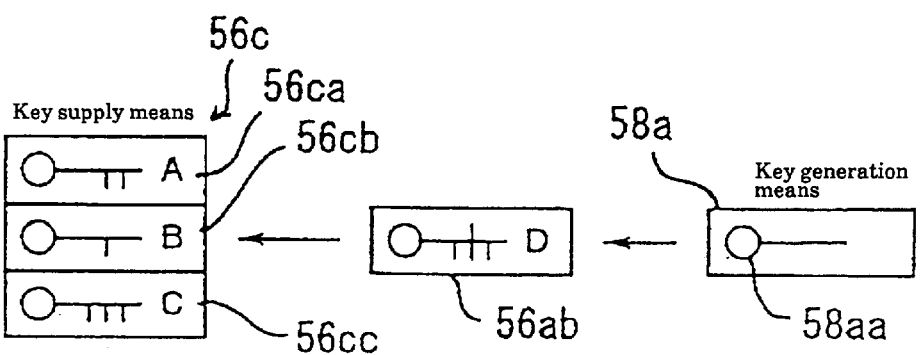
FIG. 9A is a view showing how a new key is typically generated.
FIG. 9B is a view indicating how a key is generated by use of a key table.
Figure 9:
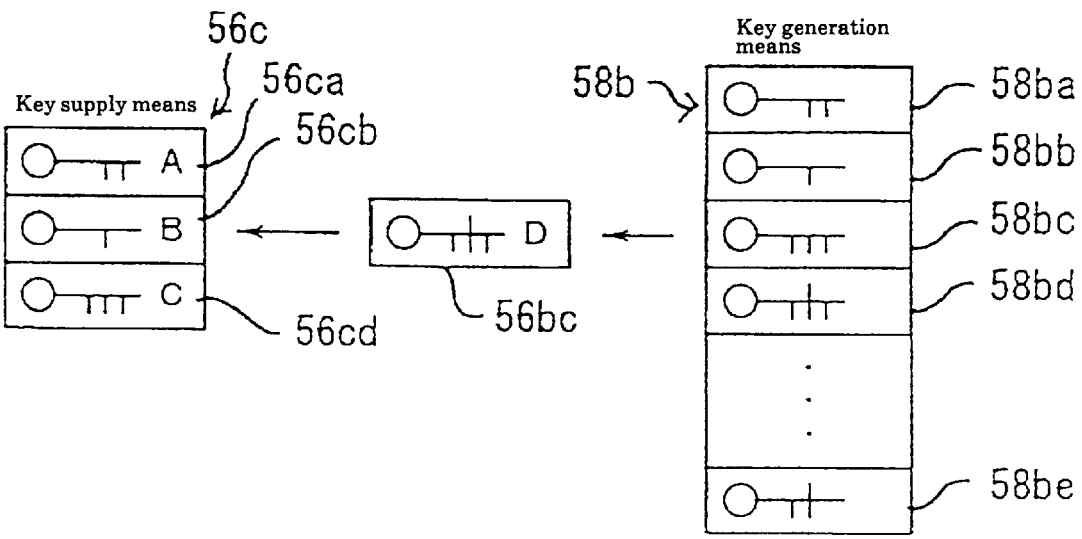

The key D is generated either anew or by retrieval from a key table having numerous keys stored therein. FIGS. 9A and 9B are views showing how a key is typically generated by these two methods. In the description below regarding the two examples of key generation, the workings of the key supply means 56c are the same as those in FIGS. 8A through 8C and, furnished with like reference numerals where applicable, will be omitted from the description.

FIG. 9A is a view of a method whereby a key is generated anew. A key generation means 58a has a prototype key 58aa inside. A new key D 56ab is generated by modifying the prototype key 58aa. The key generation means 58a may be constituted by a pseudo-random number generation using a serial shift register arrangement, or maybe implemented by employing a function using as its variables coefficients and time settings specific to the data processing apparatus in question. FIG. 9B is a view of a method whereby a new key is generated by use of a key table. A key generation means 58b has numerous keys 58ba through 58be stored therein. Any one of the stored keys (e.g., 58bd) may be selected from the key table and regarded as the new key D.

In addition to the above two methods, others may be used including obviously the combination of these two methods. If the key selection means designates a key using not a unique key name but a key identifier, the key selection means need not ascertain that keys have been changed inside the key supply means.

Figure 10:
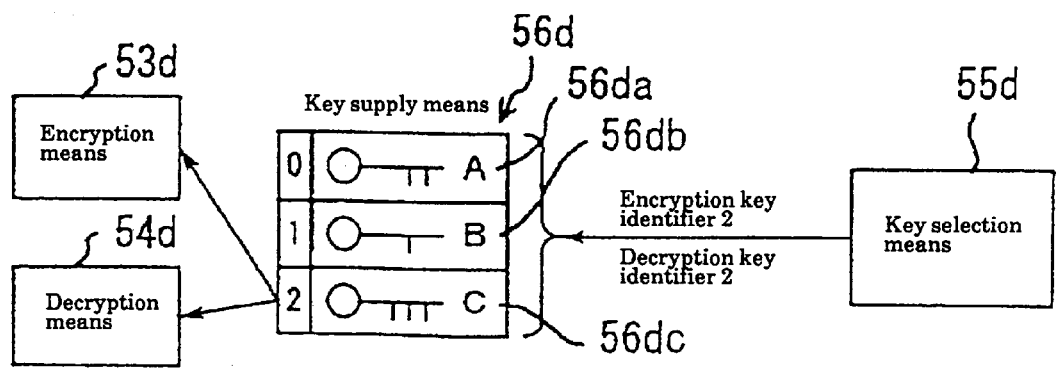
FIG. 10A is a view of an example in which use of key identifiers, the view showing a state in which a key is yet to be changed.
FIG. 10B is a view of a state in which the key has been changed but the key identifiers is the same.
Figure 10:
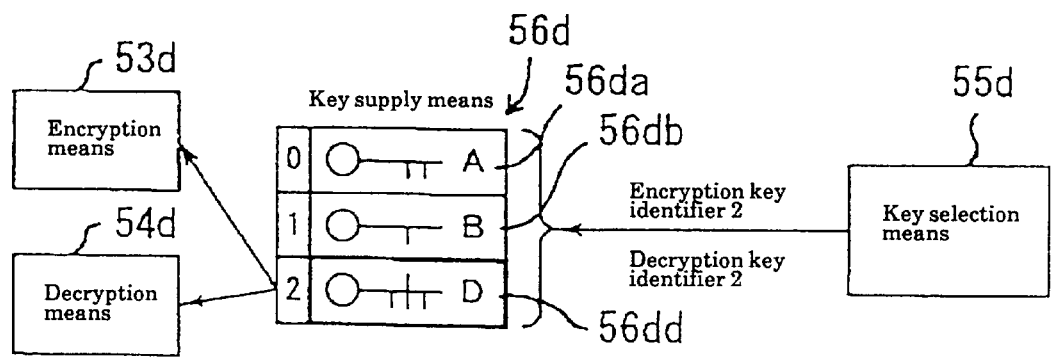

FIGS. 10A and 10B are views of a key selection method using identifiers. FIG. 10A is a view of a state in which a key is yet to be changed. The key supply means 56d contains three keys: key A 56da, key B 56db and key C 56dc furnished with identifiers 0, 1 and 2 respectively. The key selection means 55d outputs "2" both as an encryption key identifier and as a decryption key identifier. The encryption means 53d and decryption means 54d are thus supplied with the key C. In this state, the key C is replaced with the key D.

FIG. 10B is a view of a state in which keys have been changed. Although the key selection means 55d still outputs "2" as both the encryption key identifier and the decryption key identifier, the key supply means 56d has the key D stored therein corresponding to the identifier 2. Thus the encryption means 53d and decryption means 54d are fed with the key D. This makes it unnecessary for the key selection means 55d to verify that the key C has been replaced with the key D.

Below is an example in which the timing of key updating is managed by time management means so that the re-encryption means updates keys by re-encrypting data using different keys over time. The time management means may manage the timing of re-encryption through the use of a time management table. FIG. 11 is a view of a typical time management table 59. The time management table 59 comprises a key identifier column 59a, a key life column 59b, an elapsed time column 59c and an update flag column 59d. Key identifiers 0 through 2 in the key identifier column 59a correspond respectively to keys A through C. The key life column 59b contains cycles in which to update the respective keys. The elapsed time column 59c has elapsed time settings each indicating the period of time that has elapsed since the key in question started to be used. The update flag column 59d includes update flags each indicating that the elapsed time is within the corresponding key life when set to 0 and that the elapsed time has exceeded the corresponding key life when set to 1.

Using the time management table 59, the time management means manages the life of each of the keys used and the time that has elapsed since the key in question was last updated. An update flag, serving as effective key notification means, is set to 1 when the elapsed time exceeds the corresponding key life. The effective key notification means thus notifies the re-encryption means of the need to update and change the key currently used.

In FIG. 11, the identifier 0 has a key life of 10 minutes, an elapsed time of 1 minute and an update flag set to 0. The identifier 1 has a key life of 60 minutes, an elapsed time of 30 minutes and an update flag also set to 0. The identifier 2 has a key life of 60 minutes, an elapsed time of 61 minutes and an update flag set to 1. That is, the elapsed time for the key identifier 2 has exceeded the life of the corresponding key.

Figure 12:
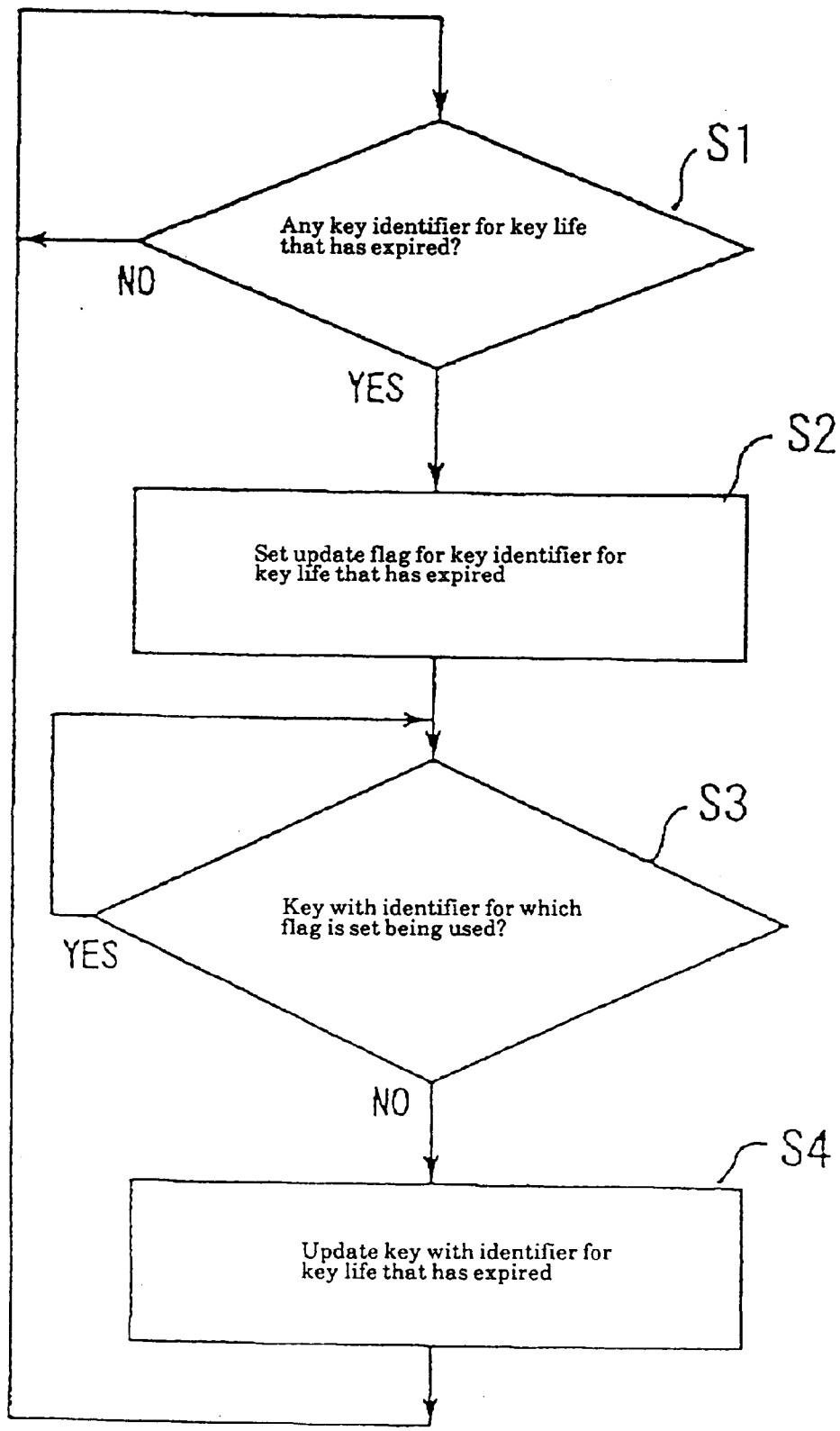
FIG. 12 is a flowchart showing a flow of processing by time management means.

FIG. 12 is a flowchart showing a flow of processing by the time management means.

In step S1, a check is made to see if any key identifier has an elapsed time exceeding the corresponding key life. If such a key identifier is detected, step S2 is reached; if no such key identifier is found, step S1 is repeated until such an identifier is detected.

In step S2, the update flag is set to 1 for the key identifier whose corresponding key life has expired.

In step S3, a check is made to see if the key with the identifier for which the flag is set is being used. If the key is in use, step S3 is repeated; if the key in question is not used, step S4 is reached. The re-encryption means provides information as to whether the key with its identifier corresponding to the flag being set is used.

In step S4, the key with the identifier whose corresponding key life has expired is updated, and step S1 is reached again.

Figure 13:
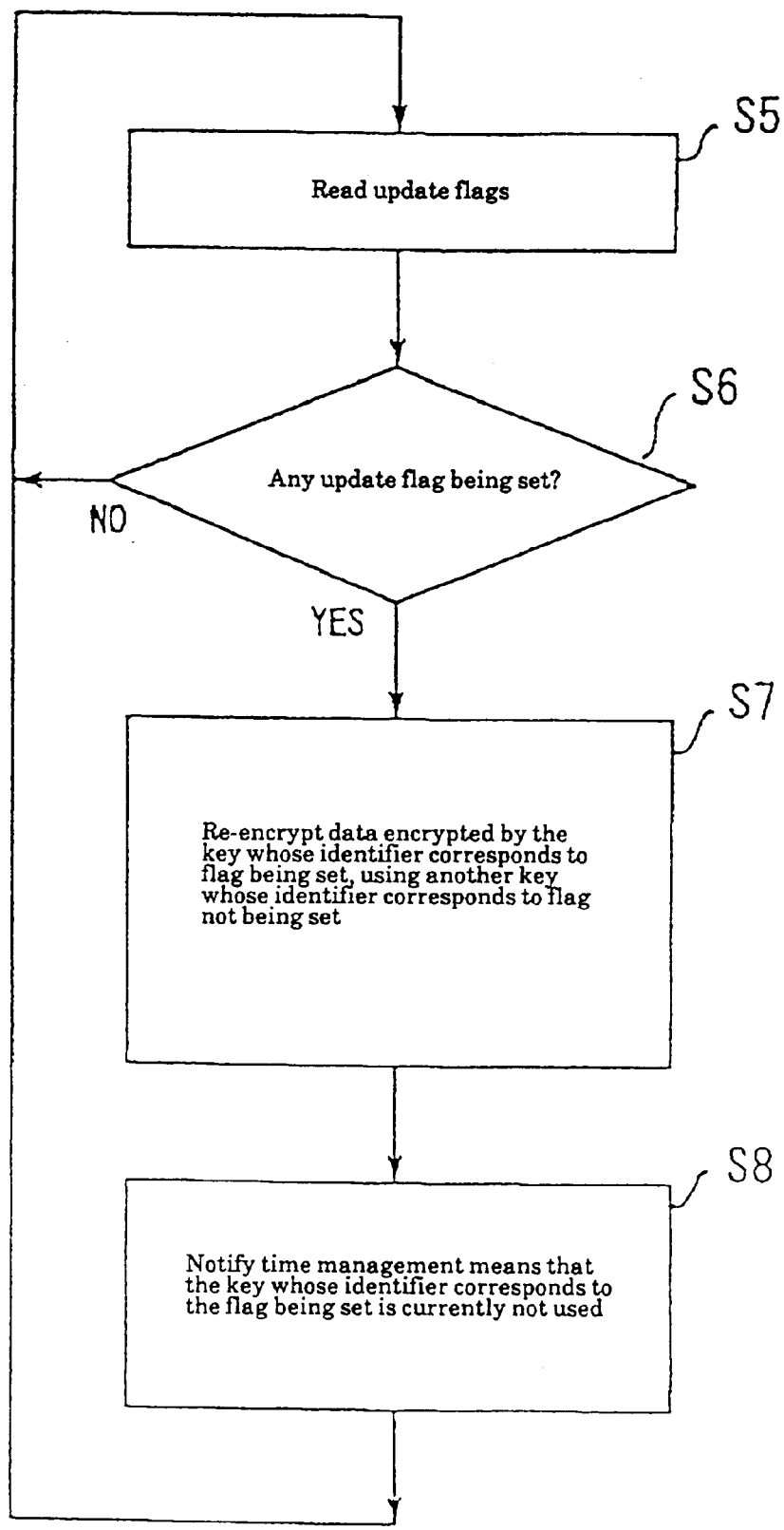
FIG. 13 is a flowchart showing a flow of processing by re-encryption means.

FIG. 13 is a flowchart showing a flow of processing by the re-encryption means.

In step S5, update flags are read.

In step S6, a check is made to see if any update flag is set. If any update flag is found to be set, step S7 is reached; if no update flag is found to be set, step S5 is reached again.

In step S7, the data encrypted by the key whose identifier corresponds to the flag being set is re-encrypted by a key whose identifier corresponds to a flag not being set.

In step S8, the time management means is notified that the key whose identifier corresponds to the flag being set is currently not used. Then step S5 is reached again.

When the time management means and re-encryption means work as depicted in FIGS. 12 and 13, the time management means first detects a key whose life has expired and sets the update flag of that key. The re-encryption means detects the update flag being set, replaces the corresponding flag with another key whose flag is not set, and notifies the time management means thereof. In turn, the time management means ascertains that the key with its identifier corresponding to the flag being set is now not used, and requests the key supply means to update the key whose life has expired. In this manner, keys are updated securely.

Figure 14:
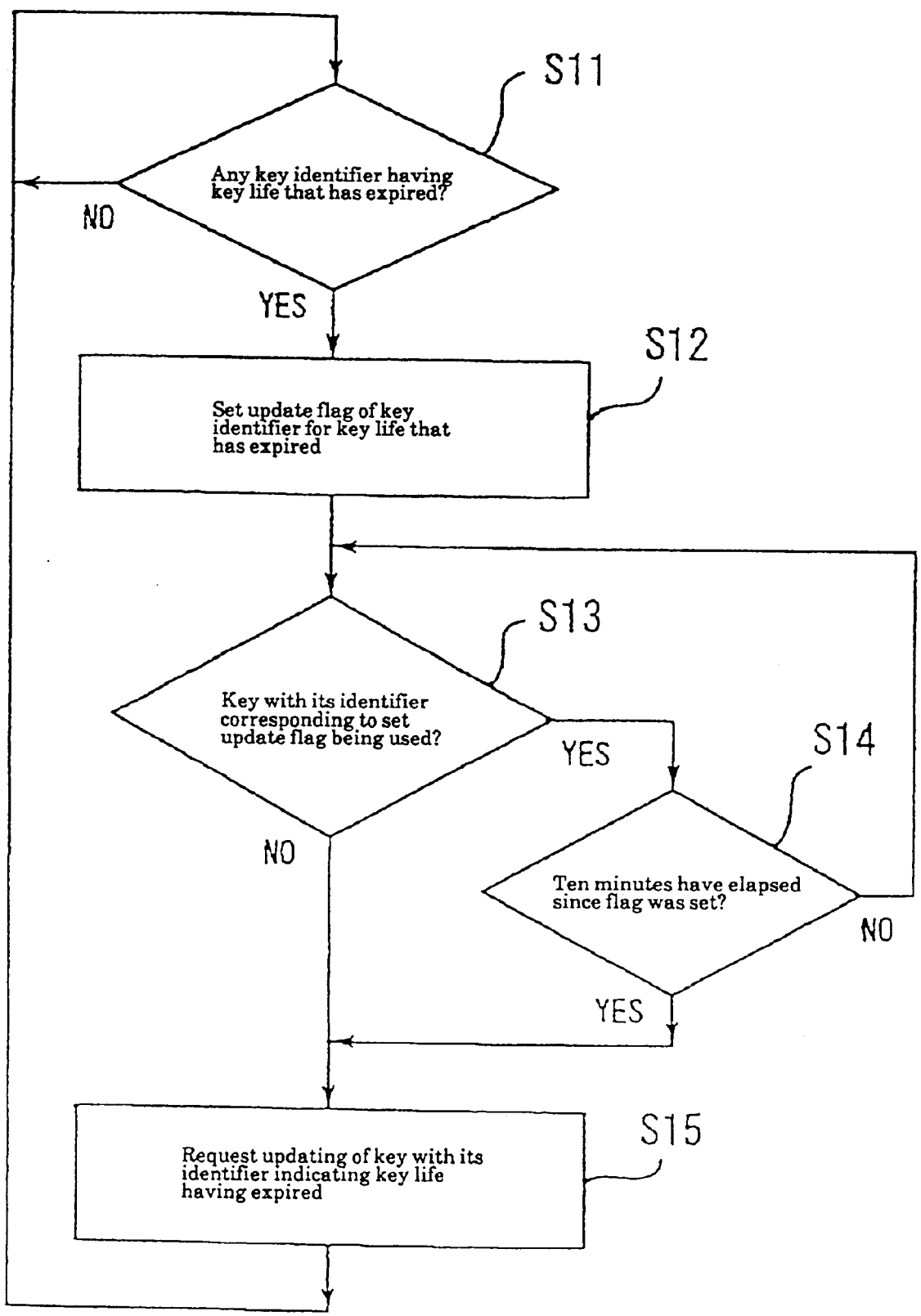
FIG. 14 is a flowchart showing another flow of processing by the time management means.

FIG. 14 is a flowchart showing another flow of key update processing by the time management means. In this example, any key is updated unfailingly within 10 minutes of its update flag being set.

In step S11, a check is made to see if any key identifier has a key life that has expired. If any key identifier whose key life has expired is detected, step S12 is reached; if no such key identifier is found, step S11 is repeated until such a key identifier is detected.

In step S12, the update flag of the key identifier corresponding to the key life that has expired is set.

In step S13, a check is made to see if the key with its identifier corresponding to the update flag being set is in use. If the key in question is currently used, step S14 is reached; if the key is not in use, step S15 is reached.

In step S14, a check is made to see if 10 minutes have elapsed since the flag was set. If the 10-minute period has passed, step S15 is reached. If the 10 minutes have yet to elapse, step S13 is reached again.

In step S15, a request is made to update the key with its identifier indicating a key life having expired, and step S11 is reached again.

In the manner described, keys are forcibly updated even if the re-encryption means is tampered with and ceases to change keys. The resulting malfunction of the data processing means keeps data secret in a self-destructive fashion. Although the above example requires that any key must be updated within 10 minutes of its update flag being set, the update cycle may be varied as needed, by taking into consideration the working status of the system and the processing capability of the data processing means 1. An alternative to forcibly updating keys is to have the system reset by generating a non-maskable interrupt (NMI).

Below is a description of some typical key management methods for use with the key selection means 55. Which data is to be encrypted by which encryption method and which encryption key is managed easily by use of addresses in the storage means 61. In a system that does not adopt a virtual storage method, the addresses in the storage means 61 may be used either directly or in appropriate increments. For example, a key management table may be used to manage the correspondence between addresses and encryption keys.

In a system that utilizes a virtual storage method for storage management, the excess pages or segments not accommodated by the storage means 61 are moved from there to the hard disk 66. The pages or segments placed in the hard disk 66 may or may not be set to the same addresses when moved back into the storage means 61. This means that keys cannot be managed by direct use of the addresses in the storage means 61. In such a case, keys must be managed by means of virtual addresses. There are four ways to implement key management based on a virtual address arrangement: a method of directly using virtual addresses, a method of using fixed-length pages as physical units exchanged between the hard disk 66 and the storage means 61, a method of using variable-length segments as logical units exchanged between the hard disk 66 and the storage means 61, and a multiple virtual storage method involving the use of a plurality of storage spaces.

Figure 15:
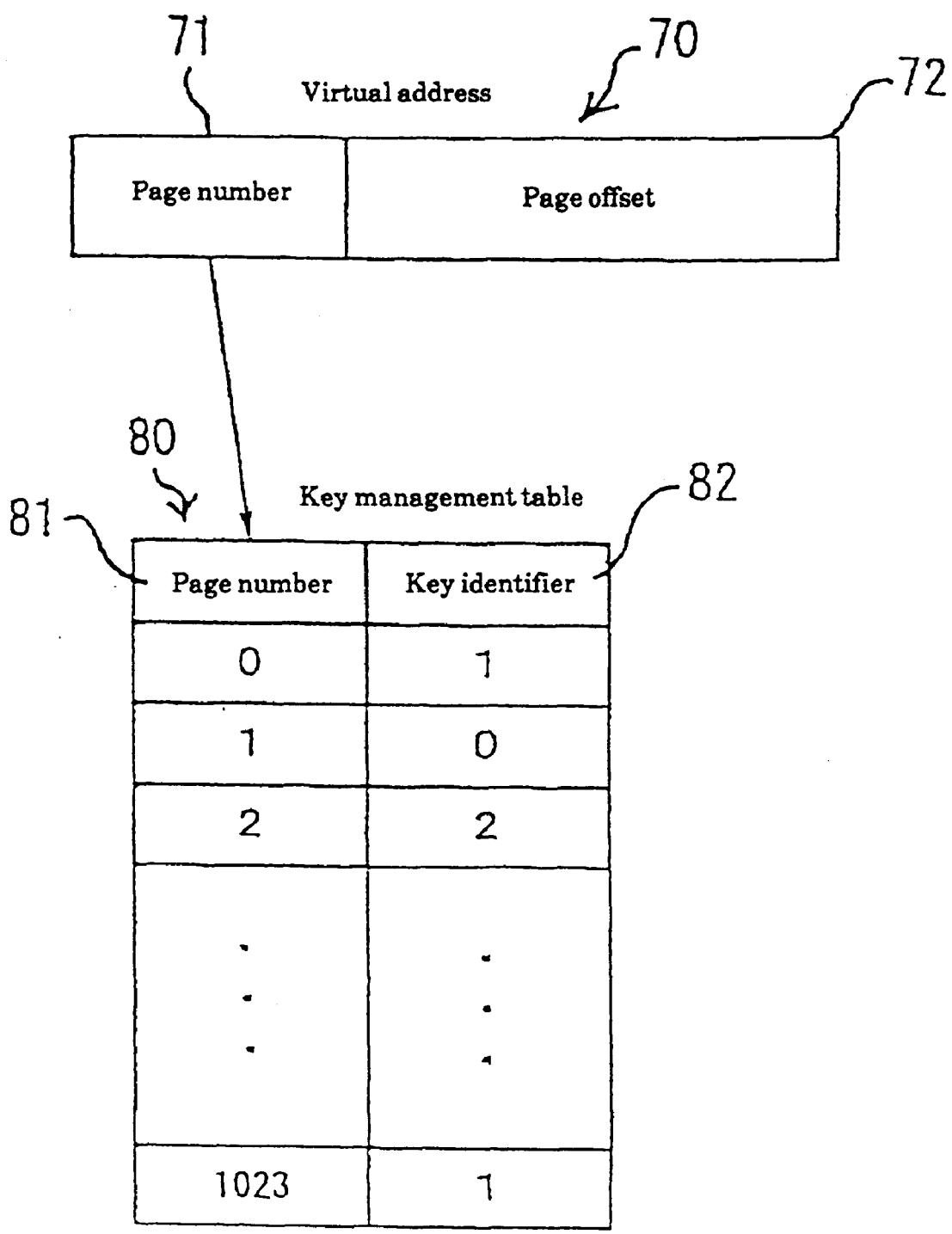
FIG. 15 is a view of a typical key management table for managing the correspondence between page numbers and key identifiers.

Virtual addresses are generally composed of a page number and a page offset each. This means that virtual storage can be managed in increments of pages through the use of a key management table that illustratively manages the correspondence between page numbers and key identifiers. FIG. 15 is a view of a typical key management table 80 for managing the correspondence between page numbers and key identifiers. As shown in FIG. 15, a virtual address 70 is constituted generally by a page number 71 and a page offset 72. The key management table 80 contains a key identifier column 82 comprising key identifiers 82 that correspond to page numbers making up a page number column 81. When access occurs to a given virtual address, the page number of that address is first extracted. The key identifier corresponding to the extracted page number is then selected and retrieved from the key management table 80.

Figure 16:
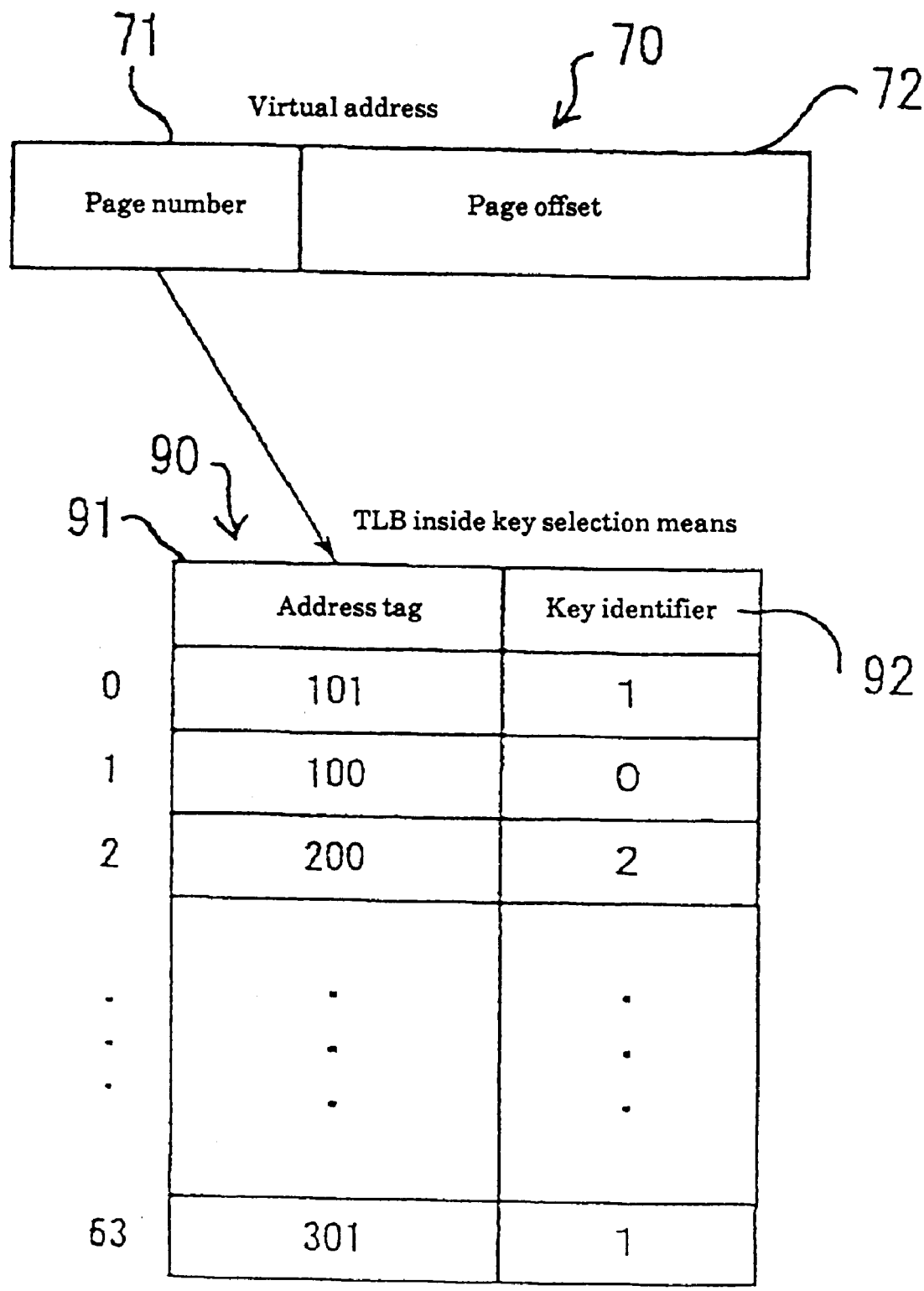
FIG. 16 is a view of a table look-aside buffer (TLB) in key selection means.

If the key management table becomes larger in size, the table may be held in the storage means 61 while that part of the key management table which is frequently used may be placed in a TLB (table look-aside buffer) inside the key selection means. In this setup, any key identifier not located in the TLB may be retrieved from the storage means 61 to update the TLB contents. FIG. 16 is a view of a typical table look-aside buffer (TLB) 90 in the key selection means. The TLB 90 is composed of an address tag column 91 and a key identifier column 92. The address tag column 91 comprises address tags each accommodating the page number 71 of a virtual address 70. The key identifier corresponding to each page number 71 thus stored is placed in the applicable field of the key identifier column 92. This arrangement reduces the size of the memory necessary for retaining the key management table.

Figure 17:
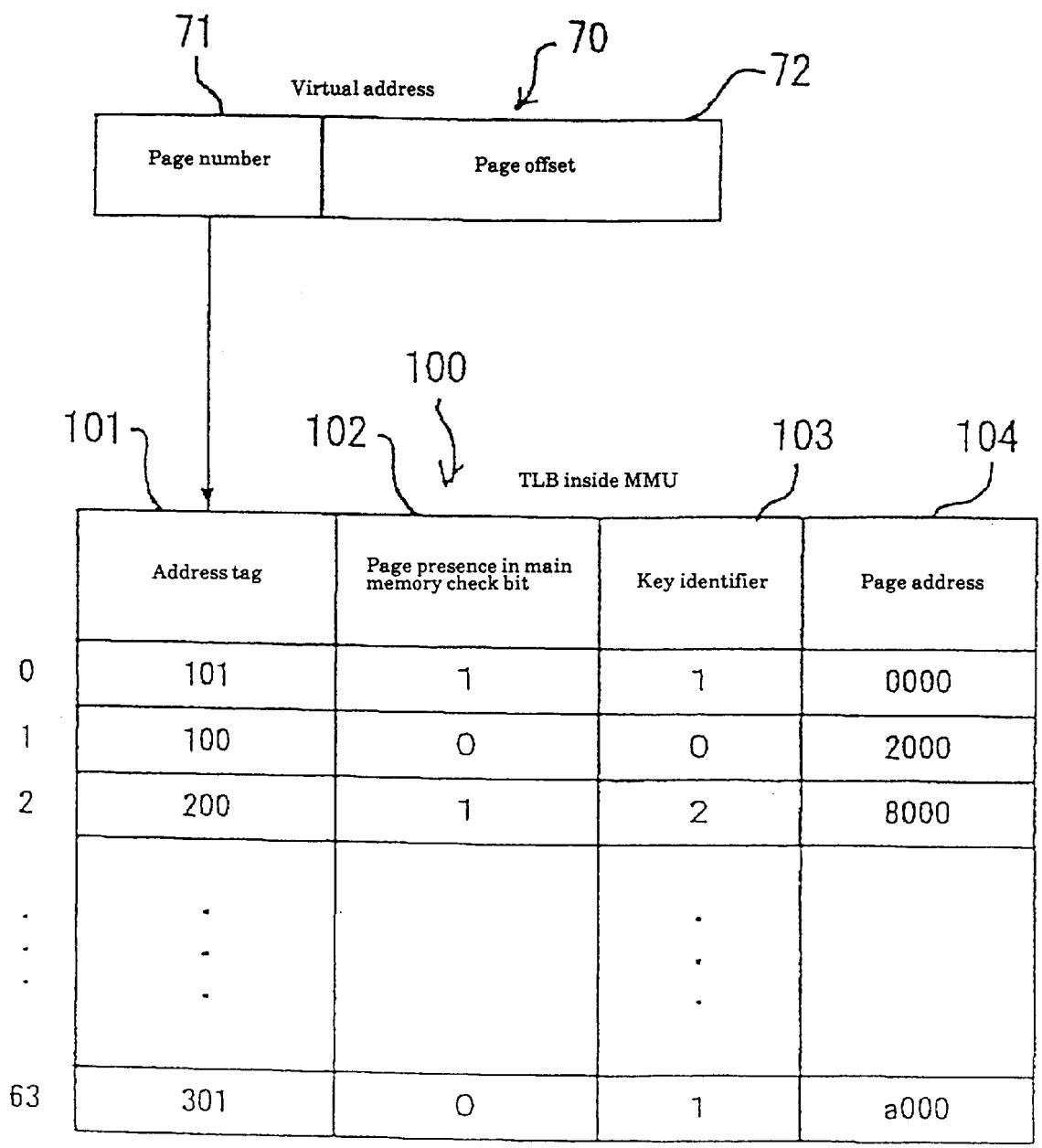
FIG. 17 is a view of a TLB in a memory management unit (MMU)

A system that manages virtual storage using pages generally has a page table for virtual storage management. The page table is used to manage both translation from a virtual address to a physical address and checks on whether any given page is located in main memory. In terms of hardware, virtual-to-physical address translation and checks on page presence in main memory are carried out by a memory management unit (MMU). When key identifier information is added to the page table, the functions of the MMU and those of the key management table may be merged. FIG. 17 is a view of a typical TLB 100 in the MMU. The TLB 100 comprises an address tag column 101, a page-presence-in-main-memory check bit column 102, a key identifier column 103 and a page address column 104. The address tag column 101 contains page numbers 71 each representing a virtual address 70. A page-presence-in-main-memory check bit in the column 102 indicates whether the page in question resides in main memory. The corresponding key identifier in the column 103 points to the key to the page. The address of the page is given in the page address column 104. The same key management procedure also applies where pages are replaced with segments for management.

If virtual storage is used in combination with a write-back type cache memory for address-based encryption key management, it is impossible to select keys by software. In that case, the use of an MMU as shown in FIG. 17 allows keys to be selected on a hardware basis. Inside the MMU, an associative memory accommodates that part of a page table and a segment table in which address tags each representing a page number and a segment number are used as addresses. There exist in the MMU the pages or segments to which belong the data residing usually in cache memory. Thanks to the presence of the page table or segment table arrangement in the MMU, obtaining a key address from the MMU makes it possible to select the corresponding key in hardware terms.

Figure 18:
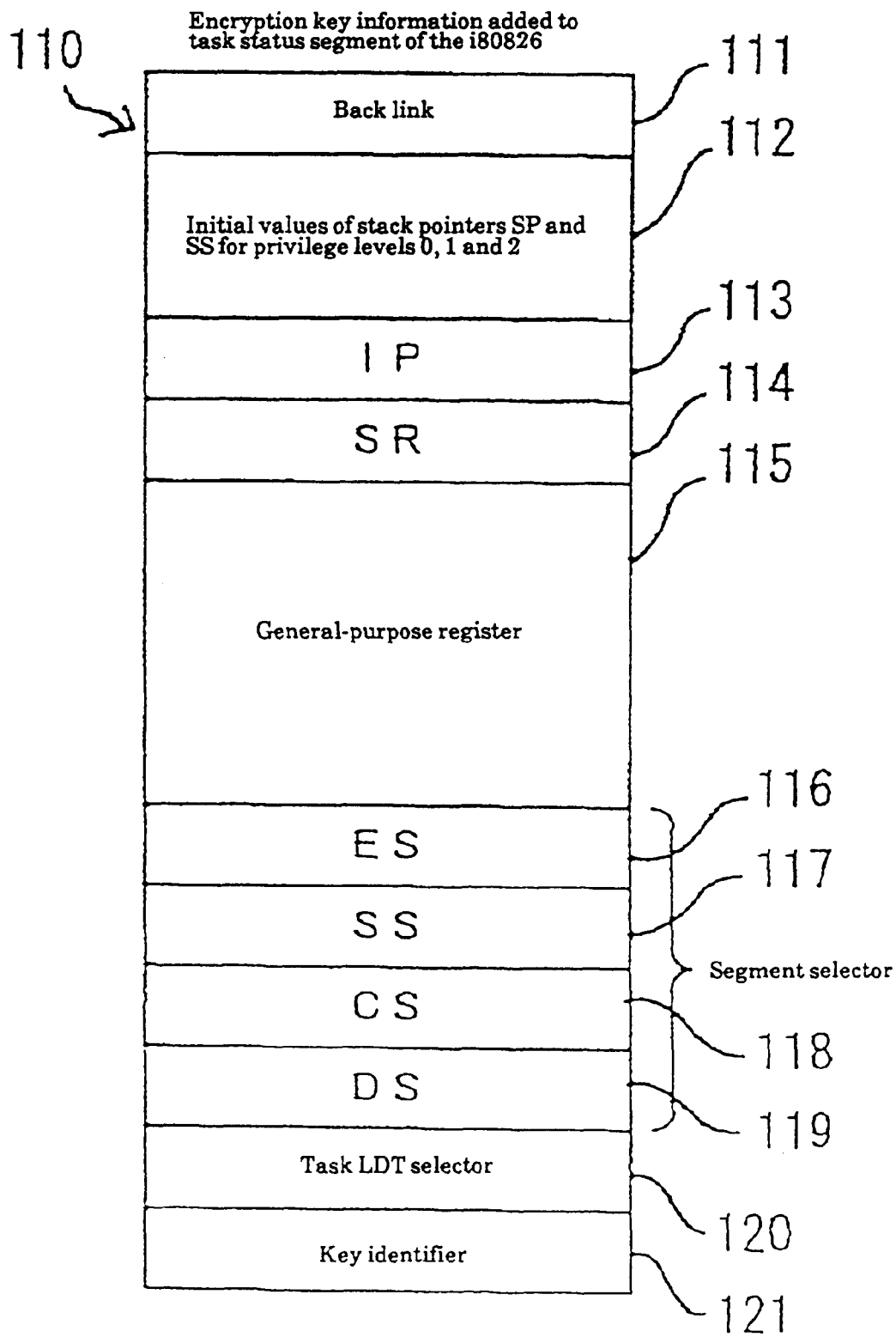
FIG. 18 is a view of an example in which a task status segment of the i80286 (an MPU from Intel) is supplemented by key address information.

FIG. 18 is a view of an example in which a task status segment 110 of the i80286 (an MPU from Intel) is supplemented by key address information. The task status segment 110 comprises aback link region 111, a region 112 for initial values of stack pointers SP and SS for privilege levels 0, 1 and 2; an IP region 113, an SR region 114, a general-purpose register region 115, an ES region 116, an SS region 117, a CS region 118, a DS region 119, a task LDT selector region 120, and a key identifier region 121. Because the task status segment 110 is generated for each task, adding key address information to that segment allows encryption keys to be managed in units of tasks (i.e., processes). Since the i80286 adopts a multiple virtual storage system involving a virtual storage space for each task, this example is also regarded as one in which keys are managed in units of virtual storage spaces.

The data processing apparatus of FIG. 4 may execute plain data using one of two methods. One method involves having plain data encrypted by the encryption means 53 so that the data will be handled in the same manner as the encrypted data supplied. The other method is one whereby, when only encrypted supplied data is decrypted by the distributed software decryption means 52, effective key identifiers for the data are attached thereto. This makes it possible to handle plain data while keeping the secrecy of the encrypted data.

The examples above have dealt with key management involving the use of addresses or like information related to the target data to be encrypted or decrypted. Aside from the target data-related information, the contents of the data may also be utilized for key management. One such example may involve using part of the target program or data to select an encryption key and encrypting the rest of the program or data thereby. This example will be described in more detail below.

Figure 19:
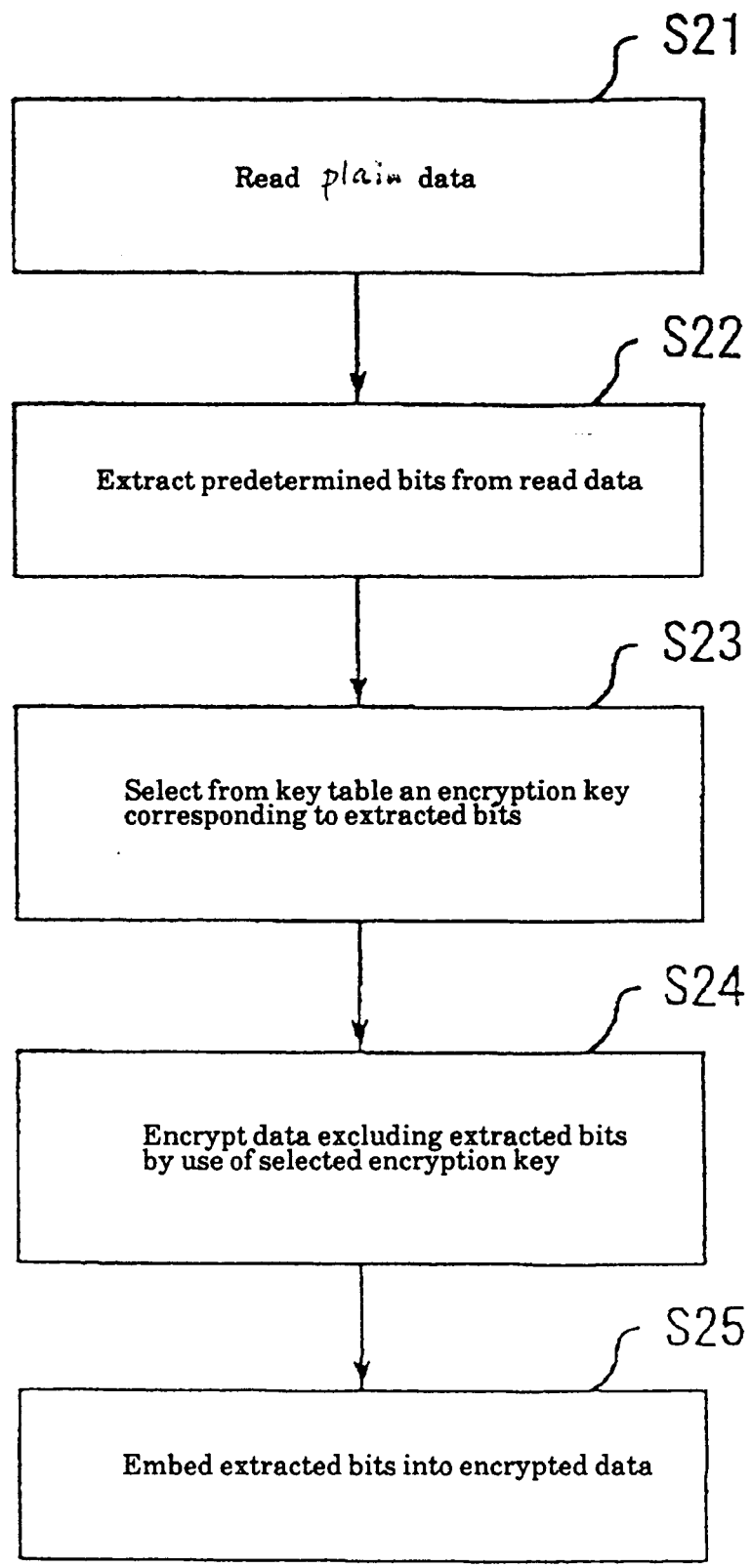
FIG. 19 is a flowchart showing a flow of encryption for key management based on the data contents.

FIG. 19 is a flowchart showing a flow of encryption processing for key management based on the data contents. The processing is carried out by the encryption means.

In step S21, target data to be encrypted is read into the encryption means.

In step S22, a specific number of bits (several bits) are extracted from the data thus read.

In step S23, an encryption key corresponding to the bits extracted in step S22 is selected from a key table.

In step S24, the encryption key selected in step S23 is used to encrypt the target data except for the several bits extracted therefrom.

In step S25, the bits extracted in step S22 are embedded in the encrypted data.

Figure 20:
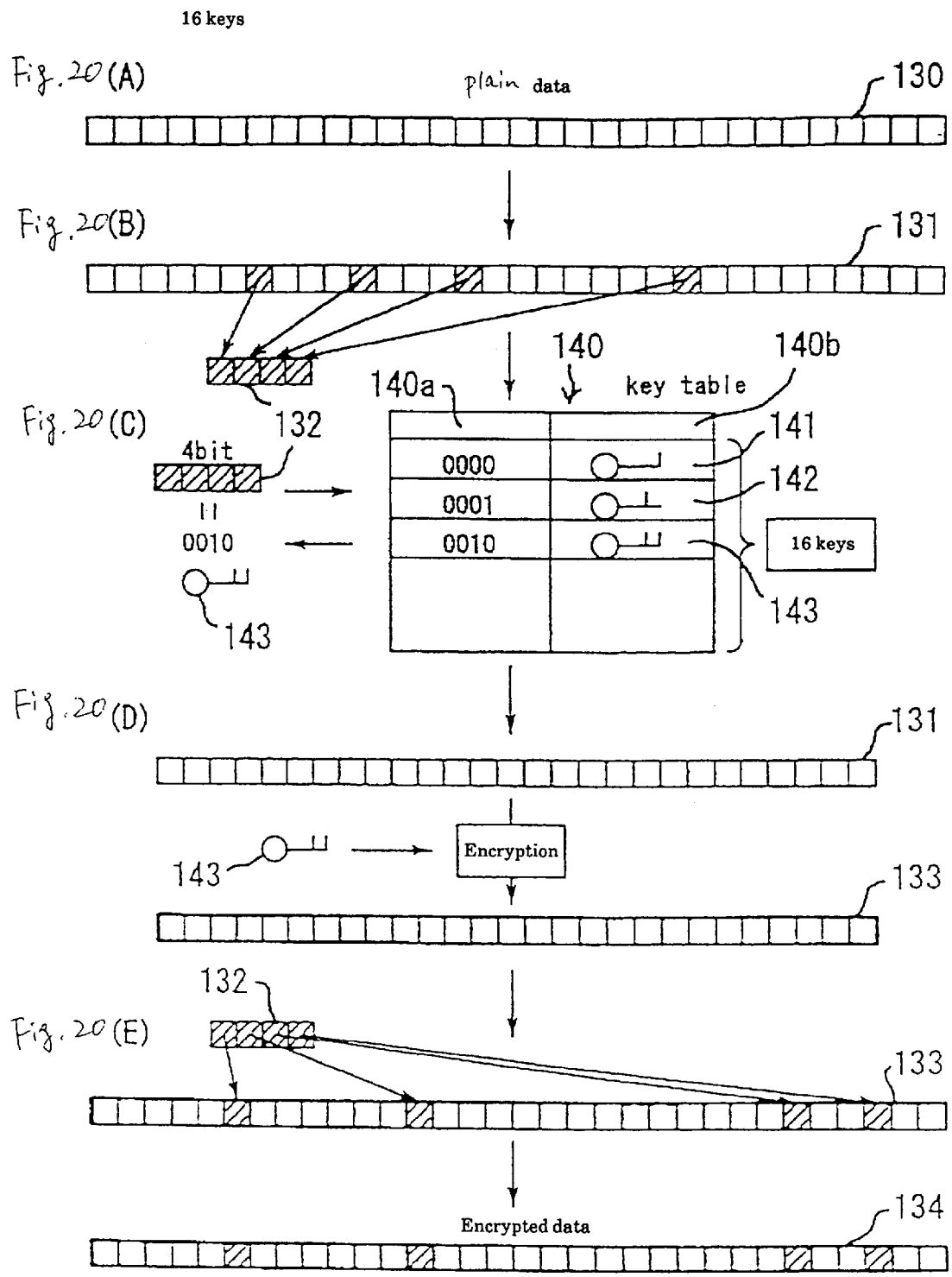
FIG. 20A is a state transition diagram corresponding to step S21.
FIG. 20B is a state transition diagram corresponding to step S22.
FIG. 20C is a state transition diagram corresponding to step S23.
FIG. 20D is a state transition diagram corresponding to step S24.
FIG. 20E is a state transition diagram corresponding to step S25.

How the target data to be encrypted varies in status in the steps outlined above will now be described with reference to the state transition diagrams of FIGS. 20A through 20E. FIG. 20A is a state transition diagram corresponding to step S21. In this step, target data 130 to be encrypted is read into the encryption means. The data 130 before encryption is composed of 32 bits and is in a state fit for direct processing by the data processing means.

FIG. 20B is a state transition diagram corresponding to step S22. In step 22, several specific bits are extracted from the uncoded data 130 according to a predetermined rule. In this example, a total of four bits (bits 7, 11, 15 and 23) are extracted, leaving 28-bit data 131 behind. The extracted bits are suitably arranged into bit information 132 .

FIG. 20C is a state transition diagram corresponding to step S23. An encryption key corresponding to the four-bit information 132 is selected from a key table prepared in advance. The key table 140 is arranged so that a key 140b corresponding to bit information 140a formed by the extracted bits is uniquely selected. Since the number of the extracted bits is four, the keys are also composed of four bits each. That is, 16 keys 141, 142, etc., are arranged to correspond respectively to 16 pieces of bit information "0000", "0001, "0010," etc. In this example, the value of the bit information 132 formed by the extracted bits is "0010." Thus a key 143 is selected as the encryption key.

FIG. 20D is a state transition diagram corresponding to step S24. The selected key 143 is used as the encryption key to encrypt the 28-bit data 131 excluding the bit information 132 formed by the extracted four bits, whereby 28-bit encrypted data 133 is generated.

FIG. 20E is a state transition diagram corresponding to step S25. In this step, the bit information 132 formed by the four bits extracted in step S22 is embedded into the 28-bit encrypted data 133. The encrypted data supplemented by the extracted bits is placed into the storage means as 32-bit encrypted data 134.

The way in which the extracted four-bit information 132 is embedded into the encrypted data is determined in combination with the way the bit information 132 is extracted from the data upon decryption. If the two methods for bit extraction and embedding are uniquely determined with respect to each other, there is no need to embed the extracted bits back to the same positions from which they were extracted. It is also possible to scramble the data in the final stage of its encryption so that any unscrupulous third party will have difficult trying to find the positions of the bits used for selecting the encryption key. To carry out scrambling in the final encryption stage requires that the method of encryption in step S24 be other than scrambling. Before the bit information 132 formed by the four extracted bits is embedded into the 28-bit encrypted data 133, the bit information may be encrypted by a suitable encryption method such as the XOR.

Figure 21:
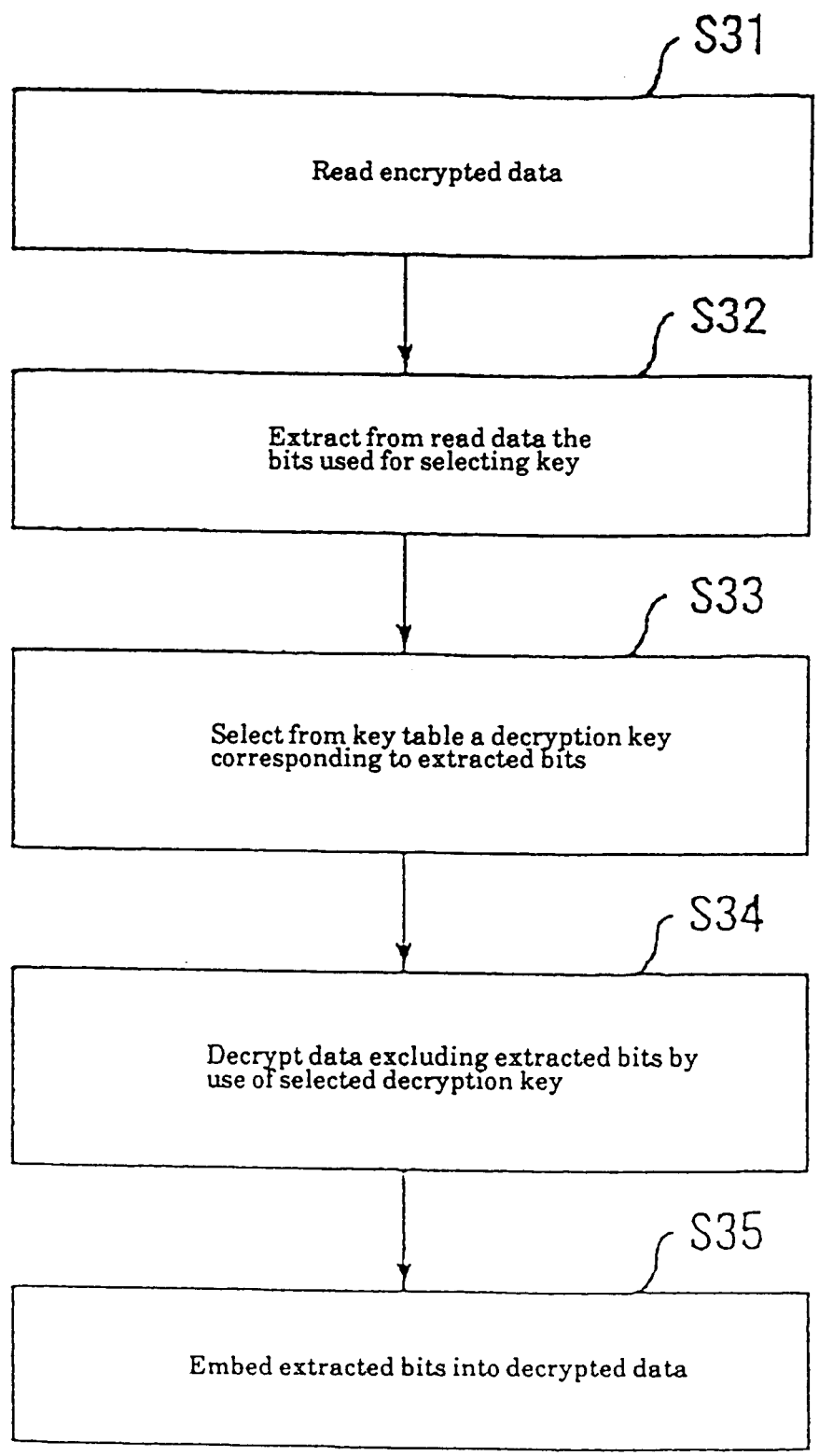
FIG. 21 is a flowchart depicting a flow of decryption for key management based on the data contents.

FIG. 21 is a flowchart depicting a flow of decryption for key management based on the data contents.

In step S31, encrypted data is read into the decryption means.

In step S32, the decryption means extracts a specific number of bits (several bits) from the data thus read.

Instep S33, a decryption key corresponding to the several bits extracted in step S32 is selected from the key table.

In step S34, the decryption key selected in step S33 is used to decrypt the target data excluding the several bits extracted.

In step S35, the several bits extracted in step S32 are embedded into the decrypted data.

How the target data to be decrypted varies in status in the steps outlined above will now be described with reference to the state transition diagrams of FIGS. 22A through 22E. In this example, the target data is 32 bits long. It is assumed here that the 32-bit data is stored in the storage means after being encrypted by the encryption method shown in FIGS. 19 and 20A through 20E. It is also assumed that the same key is used for both encryption and decryption.

Figure 22A:
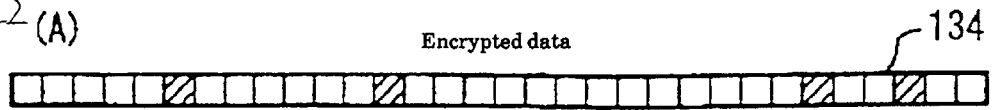
FIG. 22A is a state transition diagram corresponding to step S31.

FIG. 22A is a state transition diagram corresponding to step S31. The encrypted data 134 is read from the storage means. The encrypted data 134 is composed of 32 bits and is in a state unfit for direct processing by the data processing means.

Figure 22B:
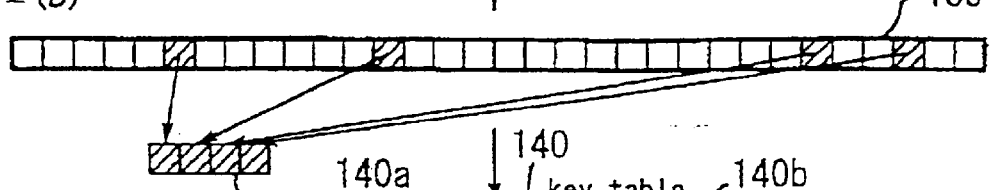
FIG. 22B is a state transition diagram corresponding to step S32.

FIG. 22B is a state transition diagram corresponding to step S32. Several specific bits are extracted from the encrypted data 134 to form bit information 132. In this example, bits 6, 13, 27 and 30 are extracted. The positions from which to extract the four bits are the same as those into which the bits of the bit information 132 are embedded upon encryption. Extracting the specific bits leaves 28-bit encrypted data 133 behind.

Figure 22C:
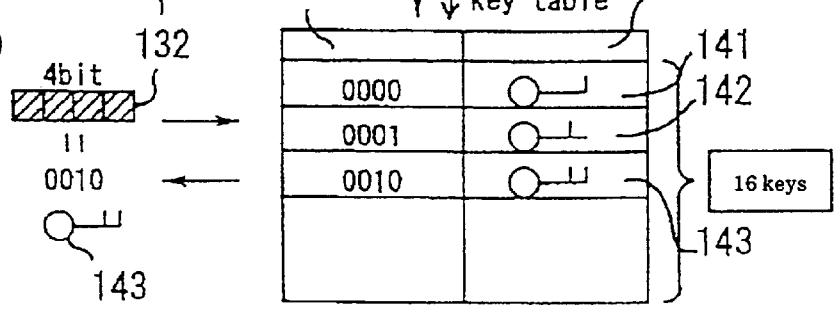
FIG. 22C is a state transition diagram corresponding to step S33.

FIG. 22C is a state transition diagram corresponding to step S33. A key 143 corresponding to the bit information 132 formed by the extracted four bits is selected from the key table 140 prepared beforehand. Because the bit information used for encryption has the value of "0010," the key table 140 may be used to select for decryption the same key 143 as that for encryption. The key 143 thus selected constitutes the decryption key.

Figure 22D:
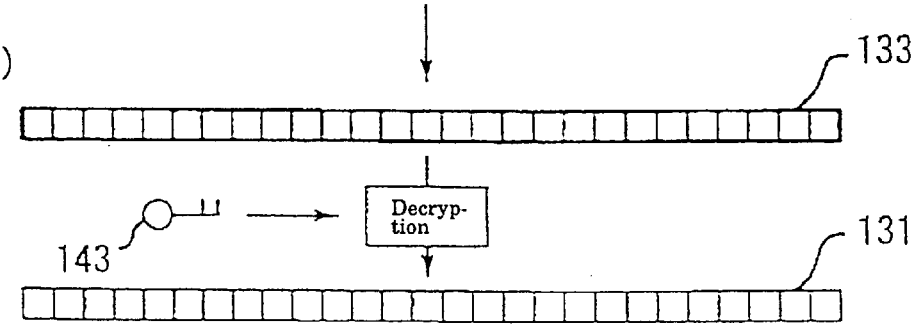
FIG. 22D is a state transition diagram corresponding to step S34.

FIG. 22D is a state transition diagram corresponding to step S34. The selected key 143 is used as the decryption key to decrypt the 28-bit encrypted data 133 excluding the extracted four-bit data 132, whereby 28-bit data 131 is generated.

Figure 22E:
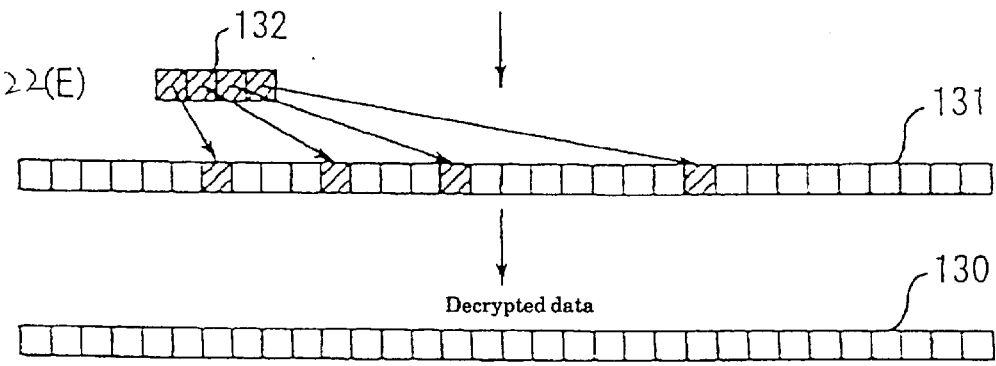
FIG. 22E is a state transition diagram corresponding to step S35.

FIG. 22E is a state transition diagram corresponding to step S35. The four-bit data 132 extracted in step S32 is embedded into the 28-bit data 131 to form 32-bit data 130.

The positions into which to embed the four bits are the same as those from which the bits were extracted upon encryption. The processing above allows the same data 130 in effect before encryption to be obtained.

As described, the data for extracting a decryption key is constituted by part of the target data to be decrypted. Because no extra information is attached to the existing data, the memory is effectively utilized. Although specific bit counts have been shown in the above examples, these are only for illustrative purposes. Any number of bits may be selected for a specific data processing apparatus with software protecting functions. It follows that encryption and decryption may be carried out efficiently when the data block for encryption is selected in connection with the bit unit (8, 16, 32, 64, 128 bits, etc.) handled by the bus, with the page unit used for virtual storage, or with the bit unit for data exchanges with cache memory.

The examples above use the same key for both encryption and decryption because the same key table is utilized in selecting keys. Alternatively, an encryption key table and a decryption key table may be provided separately so that an encryption key and a decryption key are used independently of each other. In the latter case, it is possible to employ encryption-decryption algorithms whereby encrypted data is decrypted by a decryption key different from the encryption key used to encrypt the data.

The examples above use the key table when selecting the encryption key based on the several bits extracted from the target data. Alternatively, the extracted several bits may be input to a specific function whose output value may be used as an encryption key. This variation eliminates the need for preparing a key table. Obviously, the extracted bits may also be used unmodified to constitute an encryption key.

In the examples described above, the selection of an encryption key and of a decryption key is dependent only on the target data to be protected. Because encryption keys are derived from part or all of the target data, the data can be encrypted by use of a plurality of encryption keys independently of storage addresses. Thus where complicated address management is being carried out by the operating system, a plurality of encryption keys may be managed without recourse to the operating system. This is an effective defense against attempts to tamper with the operating system so as to steal confidential data.

Because multiple keys are used for encryption, sufficiently high levels of encryption security are acquired through the use of encryption methods involving relatively small amounts of computations (e.g., XOR). This in turn minimizes the adverse effects of the encryption and decryption process on the velocity of data processing. Where data in memory is being decrypted consecutively during program execution, a sufficiently high velocity of execution is ensured with a substantially high level of encryption security provided. This makes it possible to protect the operating system residing in main memory against malicious intervention.

The components of the invention described above may be constituted by hardware circuits. In that case, the encryption key generation means is implemented by an encryption key generation circuit; the decryption key generation means, by a decryption key generation circuit; the encryption means, by an encryption circuit; the storage means, by a memory; the decryption means, by a decryption circuit; the processing means, by an ALU (arithmetic and logic unit); and the control means, by a sequencer.

In the above-described examples, different encryption and decryption keys are used for different data attributes to enhance encryption security. If keys and encryption-decryption algorithms are changed from time to time during program execution, encryption security is further boosted. One such example will be described below.

Figure 23:
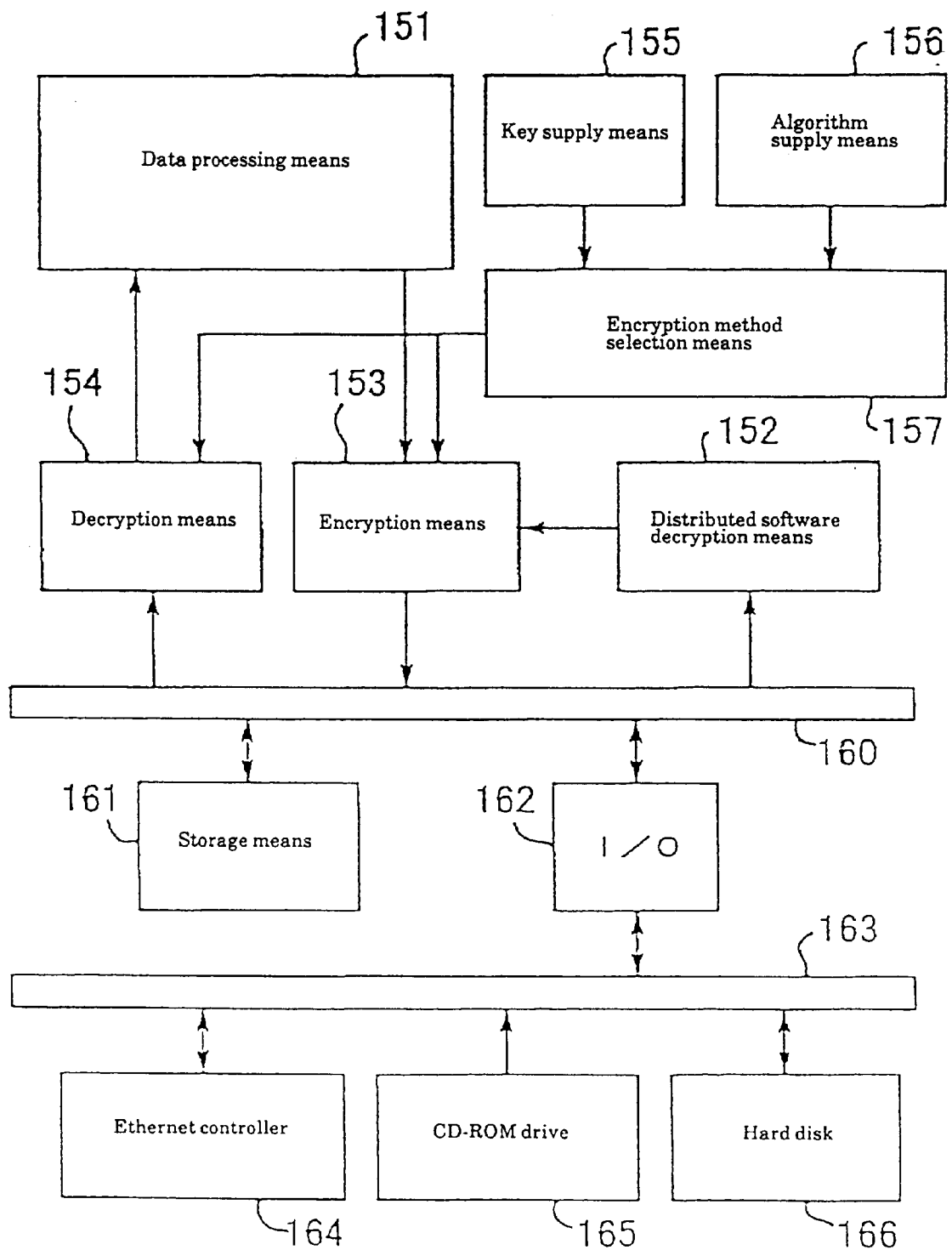
FIG. 23 is a block diagram of a typical hardware constitution of a data processing apparatus with software protecting functions capable of changing encryption-decryption algorithms from time to time.

FIG. 23 is a block diagram of a typical hardware constitution of a data processing apparatus with software protecting functions capable of changing encryption-decryption algorithms from time to time. As with the data processing apparatus with software protecting functions in FIG. 4, the apparatus of FIG. 23 comprises data processing means 151, distributed software decryption means 152, encryption means 153, decryption means 154 and key supply means 155. The encryption means 153 and decryption means 154 in this setup are different from their counterparts 53 and 54 in FIG. 4 in that the means 153 and 154 are capable of changing encryption or decryption algorithms.

The example of FIG. 23 further comprises algorithm supply means 156 for supplying encryption-decryption algorithm programs. The key selection means 55 in FIG. 4 is replaced in FIG. 23 with encryption method selection means 157 for selecting keys and algorithms to be supplied to the encryption means 153 and decryption means 154.

The rest of the constitution including a system bus 160, storage means 161, an I/O interface 162, a peripheral bus 163, an Ethernet controller 164, a CD-ROM drive 165 and a hard disk 166 are the same as those of the example in FIG. 4.

In the above constitution, a software supplier supplies the user with data encrypted by a predetermined encryption method over the network or by means of a CD-ROM and the like. The encryption method used here is assumed to be a well-known encryption method of high encryption security such as the DES. The encryption key by which the data in question was encrypted (the same key is used for both encryption and decryption in this example) is encrypted by a public key such as the RSA specific to this data processing apparatus. Thus the user is supplied with the data encrypted by an encryption method of high encryption security, paired with the encryption key encrypted by a public key.

The user sends the encrypted data and the encryption key encrypted by a public key to the distributed software decryption means 152 through the I/O interface 162. The distributed software decryption means 152 decrypts first the encryption key by use of its own secret key and then the target data by utilizing the decrypted encryption key. The decrypted data is forwarded directly to the encryption means 153. The encryption means 153 encrypts the received data using the encryption algorithm and encryption key selected by the encryption method selection means 157. The encrypted data is placed into the storage means 161. The data put into the storage means 161 remains encrypted by a secret encryption algorithm and encryption key. This means that even the user cannot gain access to the data in the storage means 161 except for the explicit purpose of data execution to be carried out by the data processing apparatus.

To execute instructions included in the data held in the storage means 161 involves first having the data decrypted by the decryption means 154 using the decryption algorithm and decryption key supplied from the encryption method selection means 157. The decrypted data is sent to the data processing means 151 for data execution thereby. Before the data resulting from execution by the data processing means 151 is written to the storage means 161, the data is encrypted by the encryption means 153. At this point, the data from the execution by the data processing means 151 can be encrypted by a different encryption method before being placed into the storage means 161. The necessary change of encryption methods is carried out by the encryption method selection means 157.

Figure 24:
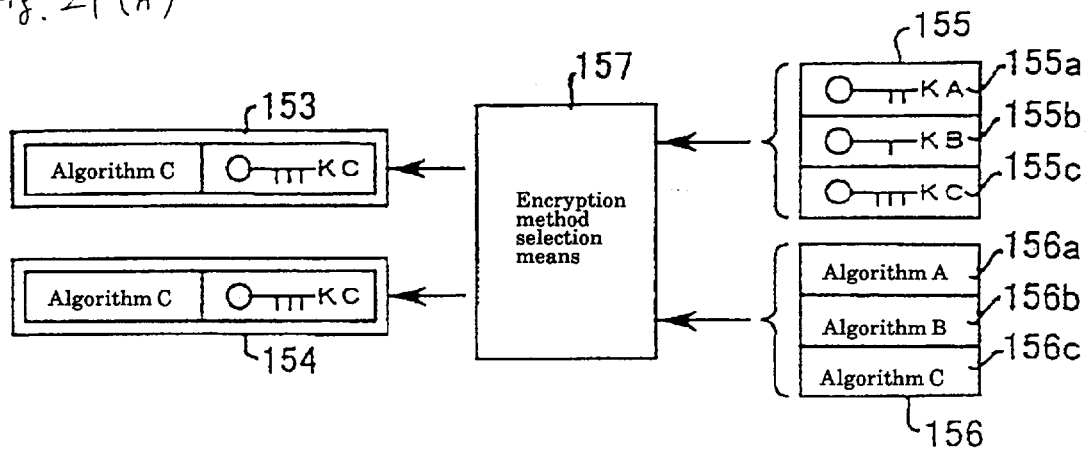
FIG. 24A is a view of an example of changing encryption methods, the view showing a state in which the current algorithm is yet to be changed.
FIG. 24B is another view of the example of changing encryption methods, the view indicating a state in which an algorithm change command has been output.
FIG. 24C is yet another view of the example of changing encryption methods, the view depicting a state in which all data that needs to be re-encrypted has been re-encrypted by use of the new algorithm.
Figure 24:
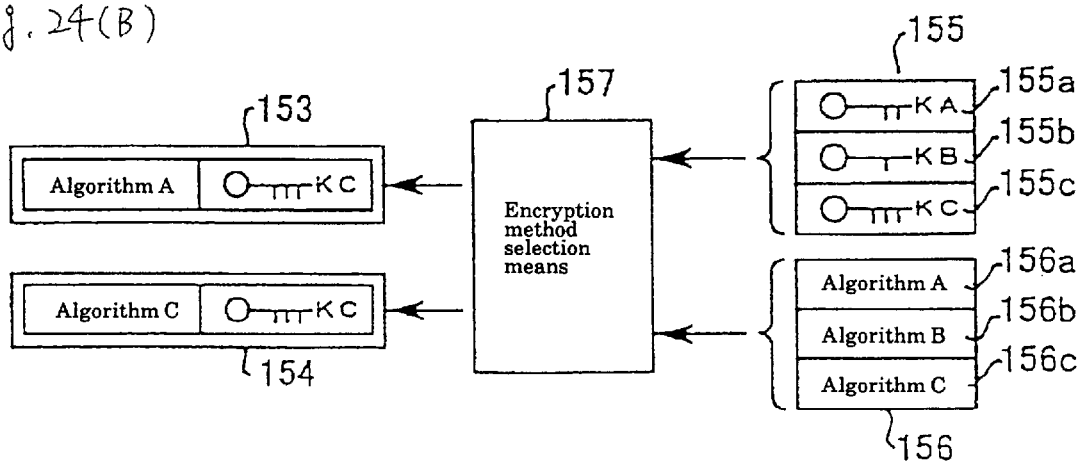
Figure 24:
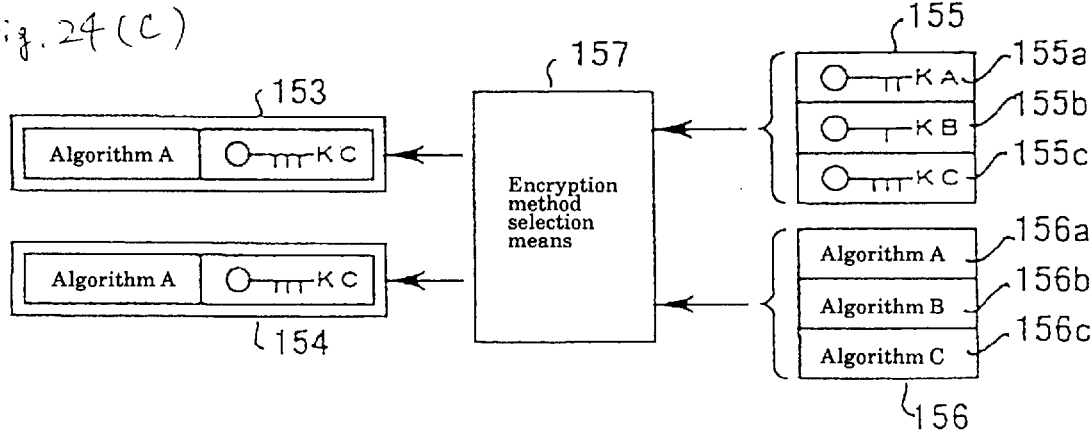

How encryption methods are typically changed by the encryption method selection means 157 will now be described. FIG. 24A, 24B and 24C are views of an example of changing encryption methods. Whereas the example of FIGS. 6A through 6C was shown to involve re-encryption by the re-encryption means, the example of FIGS. 24A through 24C will indicate that the encryption method selection means performs similar functions. For purpose of illustration and simplification, the same algorithm and the same key will be used for both encryption and decryption in this example.

FIG. 24A is a view of a state in which the current algorithm is yet to be changed. In FIG. 24A, the key supply means 155 supplies three keys: key KA 155a, key KB 155b and key KC 155c. The algorithm supply means 156 supplies three algorithms: algorithm A 156a, algorithm B 156b and algorithm C 156c. Upon encryption or decryption, the encryption method selection means 157 selects what it deems necessary from the offerings of the key supply means 155 and algorithm supply means 156. The selected key and algorithm are fed to the encryption means 153 and decryption means 154. In FIG. 24A, the algorithm C and key KC are supplied to both the encryption means 153 and the decryption means 154. (The encryption method of this key-algorithm combination will be called the encryption method CC hereunder.)

Where the data processing apparatus is operating in the above state, the change of encryption methods is suitably timed to occur. The change may typically take place upon elapse of a predetermined time following the last use of the current encryption method. In this example, the current algorithm C will be replaced with the algorithm A (i.e., encryption method AC).

FIG. 24B is a view of a state in which an algorithm change command has been output. With the change command issued, the encryption method selection means 157 hands the algorithm A over to the encryption means 153 while continuously passing the algorithm C on to the decryption means 154. In this state, a program encrypted by the encryption method CC in the storage means 161 is decrypted by the decryption means 154. The decrypted program is forwarded to the encryption means 153. The encryption means 153 encrypts the received program using the encryption method AC. The processing is carried out on all programs encrypted in the storage means 161 by the encryption method CC. Upon completion of the re-encryption process, the encryption method selection means 157 selects the new algorithm A to be supplied to the decryption means 154.

FIG. 24C is a view of a state in which all data that needs to be re-encrypted has been re-encrypted by use of the new algorithm. In this state, the encryption means 153 and decryption means 154 are both fed with the algorithm A and key C. Thereafter, programs encrypted by the encryption method AC may be executed, and data may be encrypted by use of the encryption method AC.

As described, the encryption method selection means 157 dynamically changes encryption and decryption methods so that encryption security is enhanced. A hardware setup for carrying out such algorithm changes may illustratively involve having the encryption means 153 and decryption means 154 made of a CPU and programmable logic circuits. The algorithm supply means 156 may supply programs composed of data representing the above workings (i.e., algorithms). Alternatively, the encryption means 153 and decryption means 154 may be formed by a FPGA (field programmable gate array) arrangement, with the algorithm supply means 156 supplying FPGA place and route information representing the necessary workings (algorithms). A typical FPGA capable of changing place and route information during operation is a Cache Logic™ FPGA from Atmel of the United States. For example, Atmel AT 6000 series SRAM-Based FPGA can be partially reconfigured while in operation. Portions of the device not being modified remain operational during reconfiguration. Simultaneous configuration of more than one device is also possible. This means that the processing capability of the system remains unaffected despite frequent changes of encryption methods.

Figure 25:
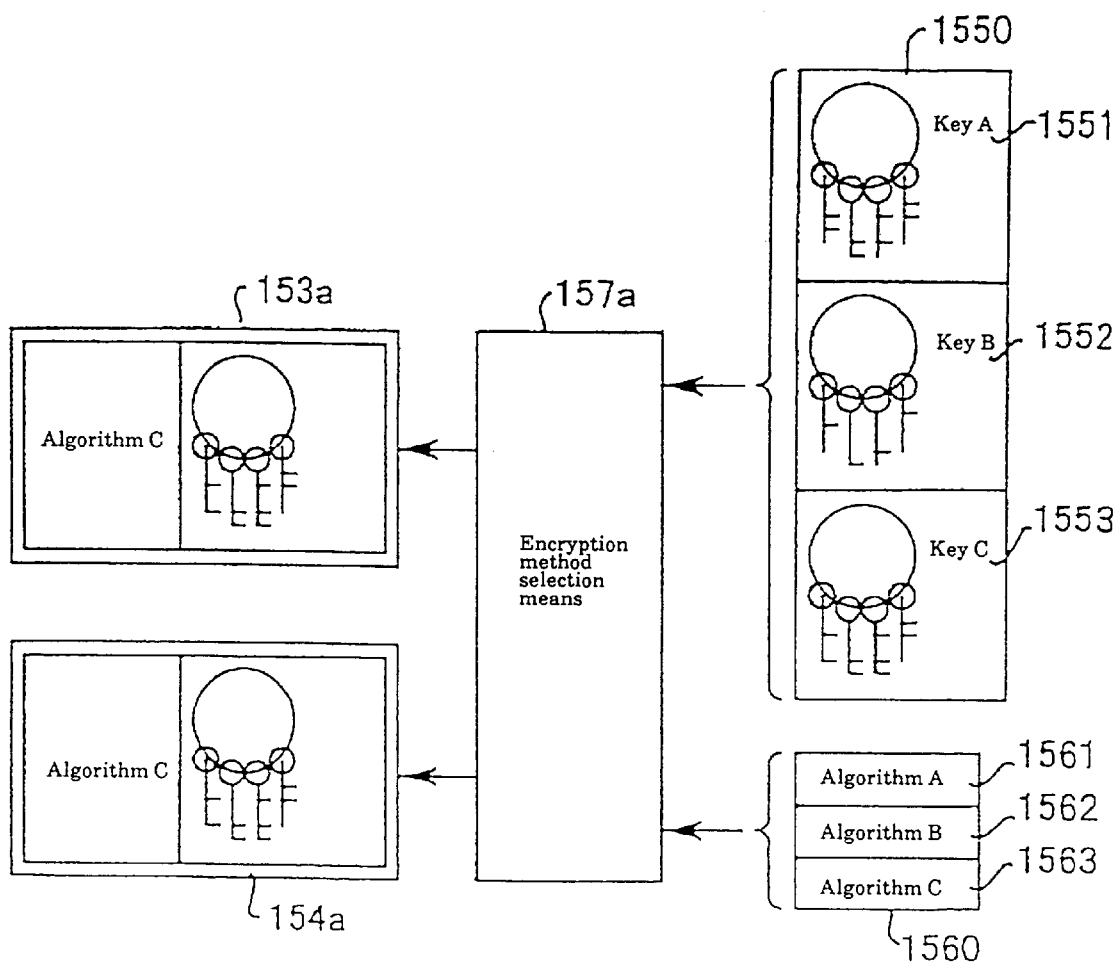
FIG. 25 is a view of an example in which a key group is selected at the time of changing encryption methods.

Each algorithm may be arranged to correspond with a key group consisting of a plurality of keys. FIG. 25 is a view of an example in which a key group is selected at the time of changing encryption methods. In this example, the key supply means 1550 has three key groups: key group A 1551, key group B 1552 and key group C 1553. As with its counterpart in FIG. 23, the algorithm supply means 1560 has three algorithms: algorithm A 1561, algorithm B 1562 and algorithm C 1563. The encryption method selection means 157a selects an appropriate key group and algorithm from these key groups and algorithms, and supplies the selected key group and algorithm to both the encryption means 153a and the decryption means 154a. In FIG. 25, the algorithm C and key group C 1553 are fed to both the encryption means 153a and the decryption means 154a.

In the above example, one key group is applied to a specific address region comprising a plurality of address fields. The individual keys making up the group are applied to the respective address fields constituting the address region in question. How the contents of the algorithm supplied by the algorithm supply means 1560 are changed will now be described below.

Figure 26:
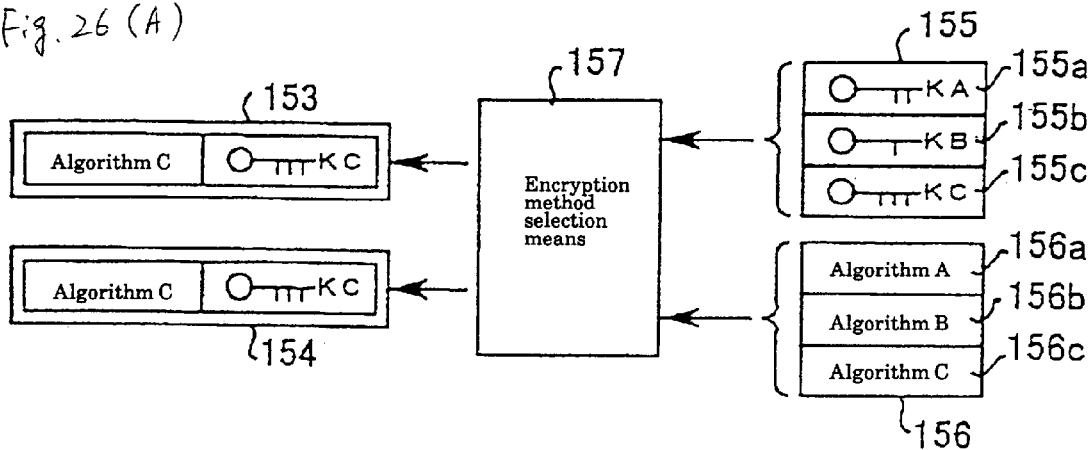
FIG. 26A is a view of an example of changing supplied algorithms, the view showing a state in which the current algorithm is yet to be changed.
FIG. 26B is another view of the example of changing supplied algorithms, the view outlining a state in which an algorithm change command has been output.
FIG. 26C is yet another view of the example of changing supplied algorithms, the view indicating a state in which a new algorithm has been selected.
Figure 26:
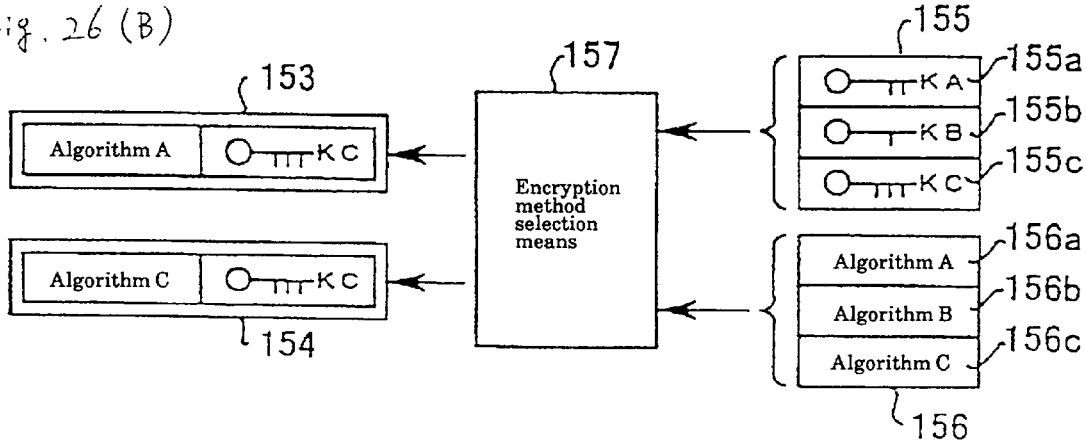
Figure 26:
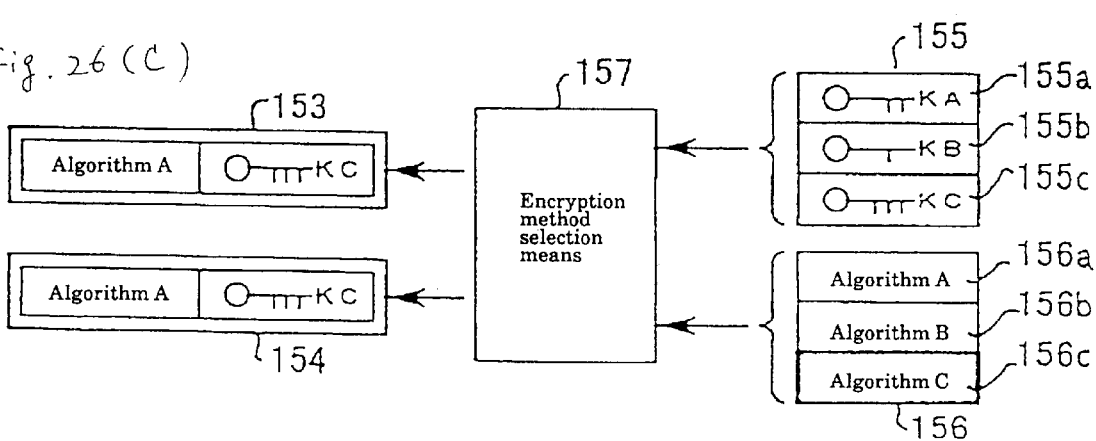

FIGS. 26A, 26B and 26C are views of an example of changing supplied algorithms. FIG. 26A is a view of a state in which the current algorithm is yet to be changed. The state of FIG. 26A is the same as that of FIG. 24A. In this example, the use of the algorithm C 156c is to be stopped, and the current algorithm is to be replaced with a new algorithm D. To stop the algorithm C from being used requires that programs encrypted by the algorithm C and stored in the storage means be re-encrypted by another algorithm. First, programs encrypted by the encryption method CC are to be re-encrypted by the encryption method AC.

FIG. 26B is a view of a state in which an algorithm change command has been output. The encryption means 153 is fed with the algorithm A. The state of FIG. 26B is the same as that of FIG. 24B. In this state, the programs encrypted by the encryption method CC are re-encrypted by the encryption method AC before being placed back to the storage means. This allows the algorithm C to be replaced with another algorithm.

FIG. 26C is a view of a state in which the new algorithm has been selected. The region that accommodated the algorithm C now holds the algorithm D 156d. From now on, the algorithm D 156d is supplied to the encryption means 153 and decryption means 154.

This kind of algorithm changeover is readily implemented by preparing an algorithm storage table. It is also possible to make arrangements so that any one of the prepared algorithms, with a time limit set on the use of each, is replaced with another algorithm when the time limit of the current algorithm has expired.

Figure 27:
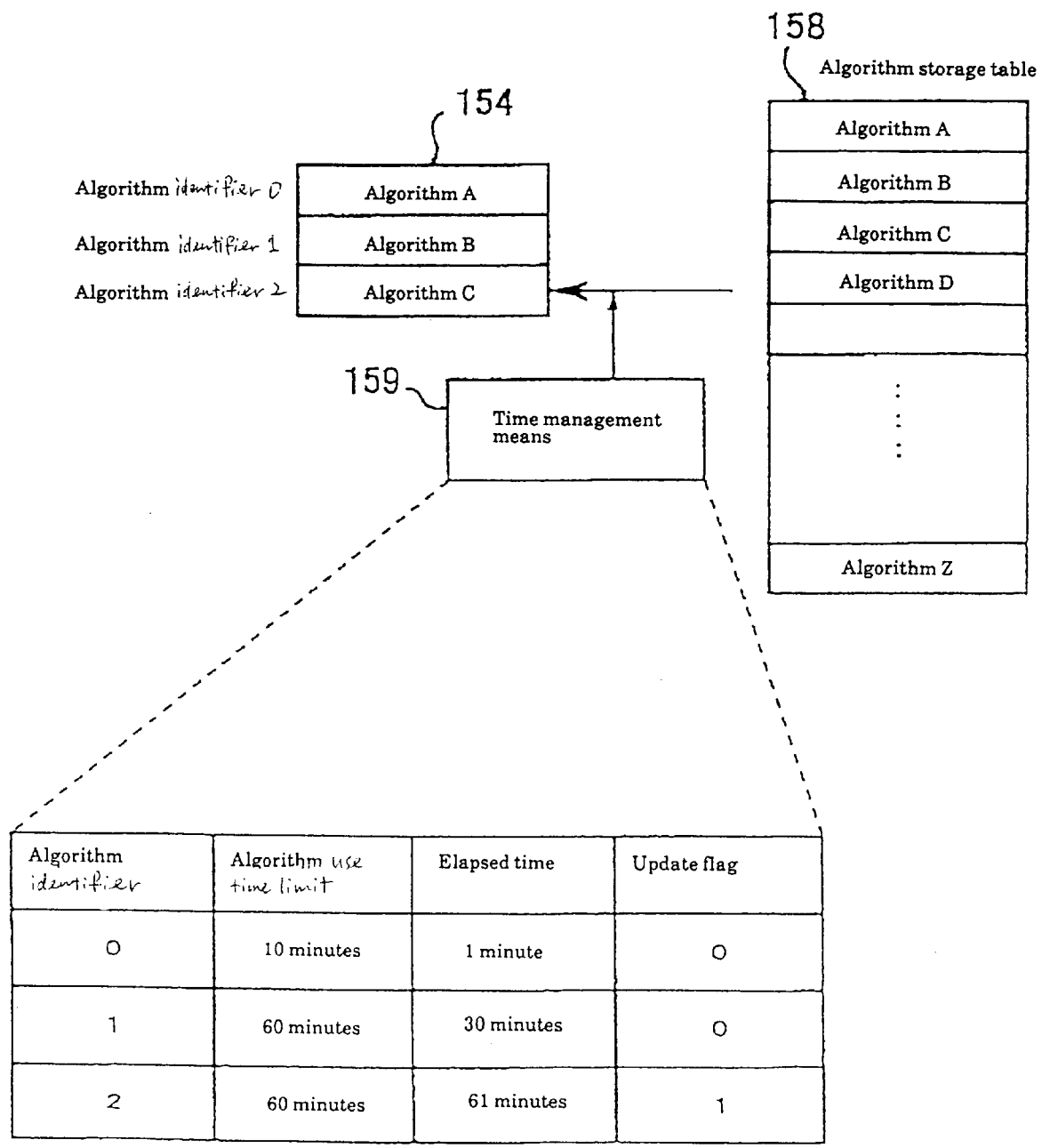
FIG. 27 is a view of an example in which algorithms are changed over time.

FIG. 27 is a view of an example in which algorithms are changed over time. The algorithm supply means 154 supplies three algorithms A, B and C. These algorithms correspond respectively to algorithm identifier 0, 1 and 2. An algorithm storage table 158 contains algorithms A through Z. Upon algorithm changeover, a new algorithm is retrieved from the algorithm storage table 158 and handed over to the algorithm supply means 154. The timing of algorithm change is controlled by time management means 159.

The time management means 159 controls three kinds of information: algorithm use time limits, elapsed times and update flags, regarding algorithm identifiers 0, 1 and 2. An algorithm use time limit is a time limit set on the use of the corresponding algorithm. An elapsed time denotes the time that has elapsed since the use of the corresponding algorithm started. An update flag is a flag that indicates whether or not the applicable elapsed time has exceed the corresponding time limit. The update flag is normally 0 and is set to 1 when the time limit is exceeded.

Below is a description of how algorithms are changed by the encryption method selection means and how algorithms are updated by the algorithm supply means.

Figure 28:
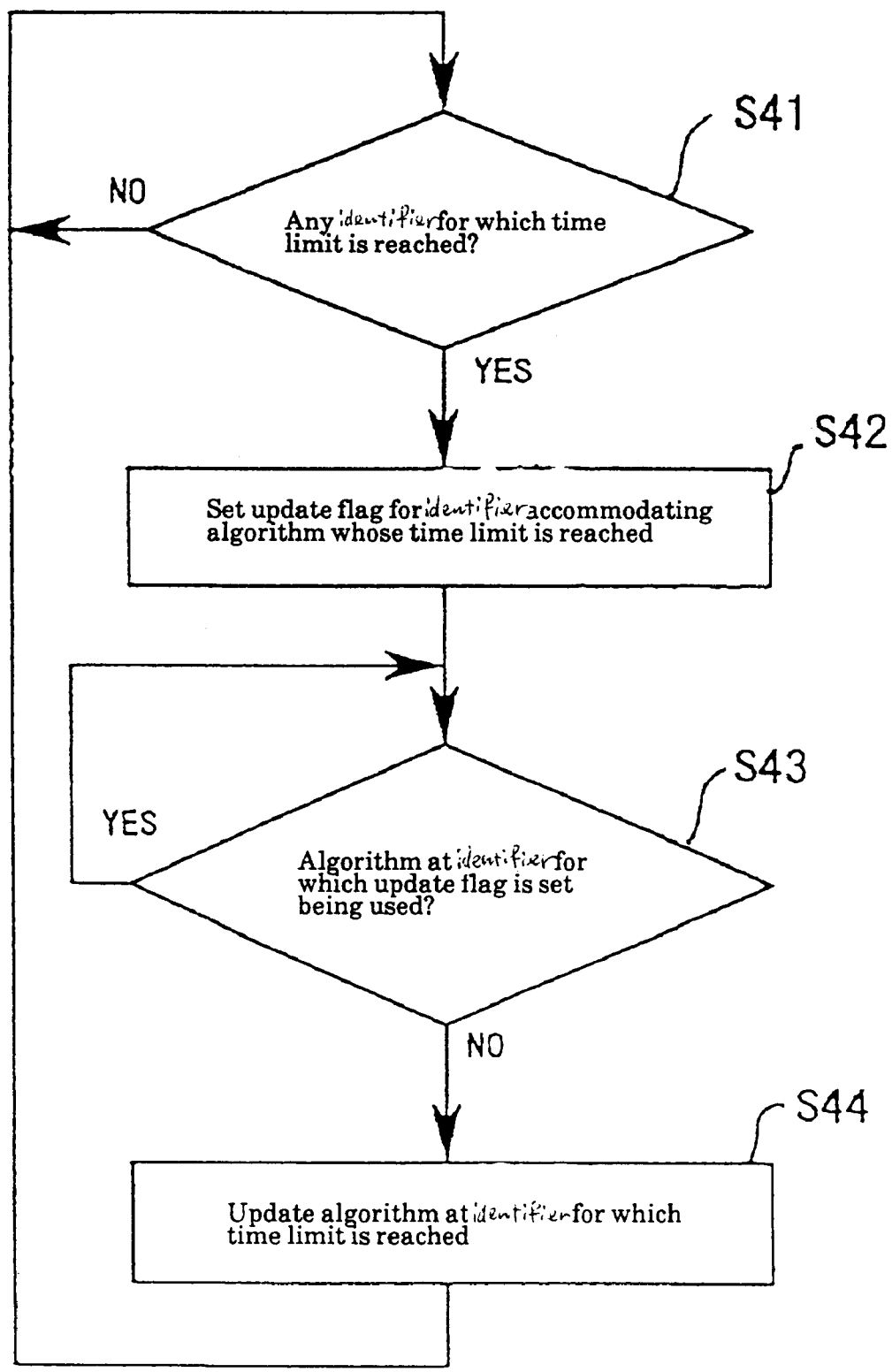
FIG. 28 is a flowchart of steps in which algorithm supply means updates an algorithm.

FIG. 28 is a flowchart of steps in which the algorithm supply means updates an algorithm.

In step S41, a check is made to see if there is any identifier for which the time limit is reached. If any such identifier is detected, step S42 is reached. If no such identifier is found, step S41 is repeated until such an identifier is detected.

In step S42, an update flag is set for the identifier accommodating the algorithm whose time limit is reached.

In step S43, a check is made to see if use is being made of the algorithm at the identifier for which the update flag is set. Information about whether the algorithm in question is being used is supplied from the encryption method selection means 157. In step S44, the algorithm at the identifier for which the time limit is reached is updated.

Figure 29:
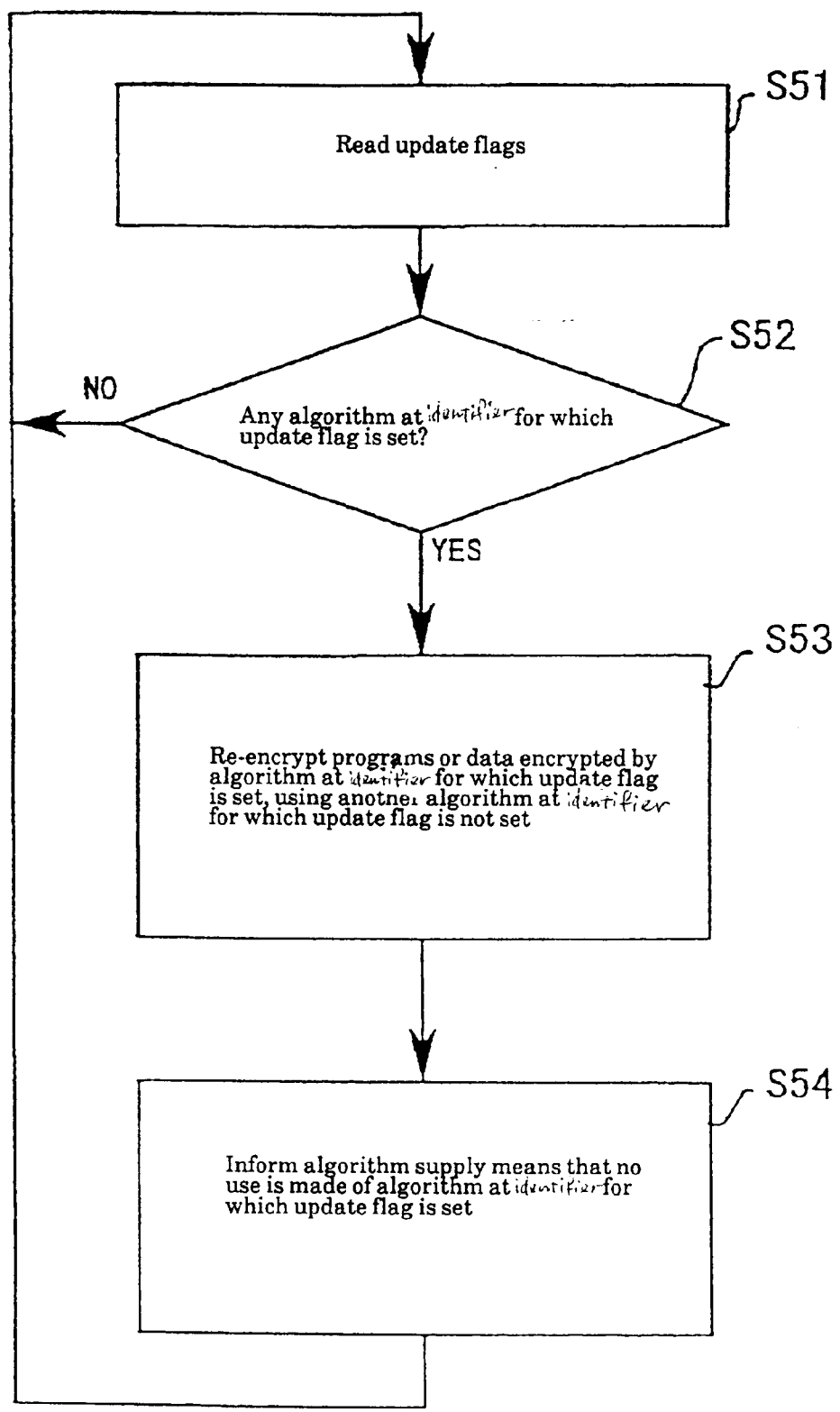
FIG. 29 is a flowchart of steps in which encryption method selection means changes algorithms.

FIG. 29 is a flowchart of steps in which the encryption method selection means changes algorithms.

In step S51, update flags for algorithms are read.

In step S52, a check is made to see if there is any algorithm at an identifier for which the update flag is set. If any such algorithm is detected, step S53 is reached. If no such algorithm is found, steps S51 and S52 are repeated until an algorithm for which the update flag is set is detected.

In step S53, programs or data encrypted by the algorithm at the identifier with its update flag being set are re-encrypted by use of an algorithm at an identifier for which the update flag is not set.

In step S54, with all applicable programs re-encrypted, the algorithm supply means 156 is informed that no further use is made of the algorithm at the identifier for which the update flag is being set.

When the above-described processes are repeated by the algorithm supply means and encryption method selection means, an algorithm whose time limit is reached is detected from time to time and replaced with a new algorithm. Each algorithm that has been replaced is updated after all programs encrypted by the replaced algorithm have been re-encrypted by the new algorithm. This eliminates potential troubles associated with the replacement of algorithms.

In case an algorithm for which the update flag is being set is not updated upon elapse of a certain period of time, the algorithm in question may be updated forcibly. Described below is an example of such forced algorithm update.

Figure 30:
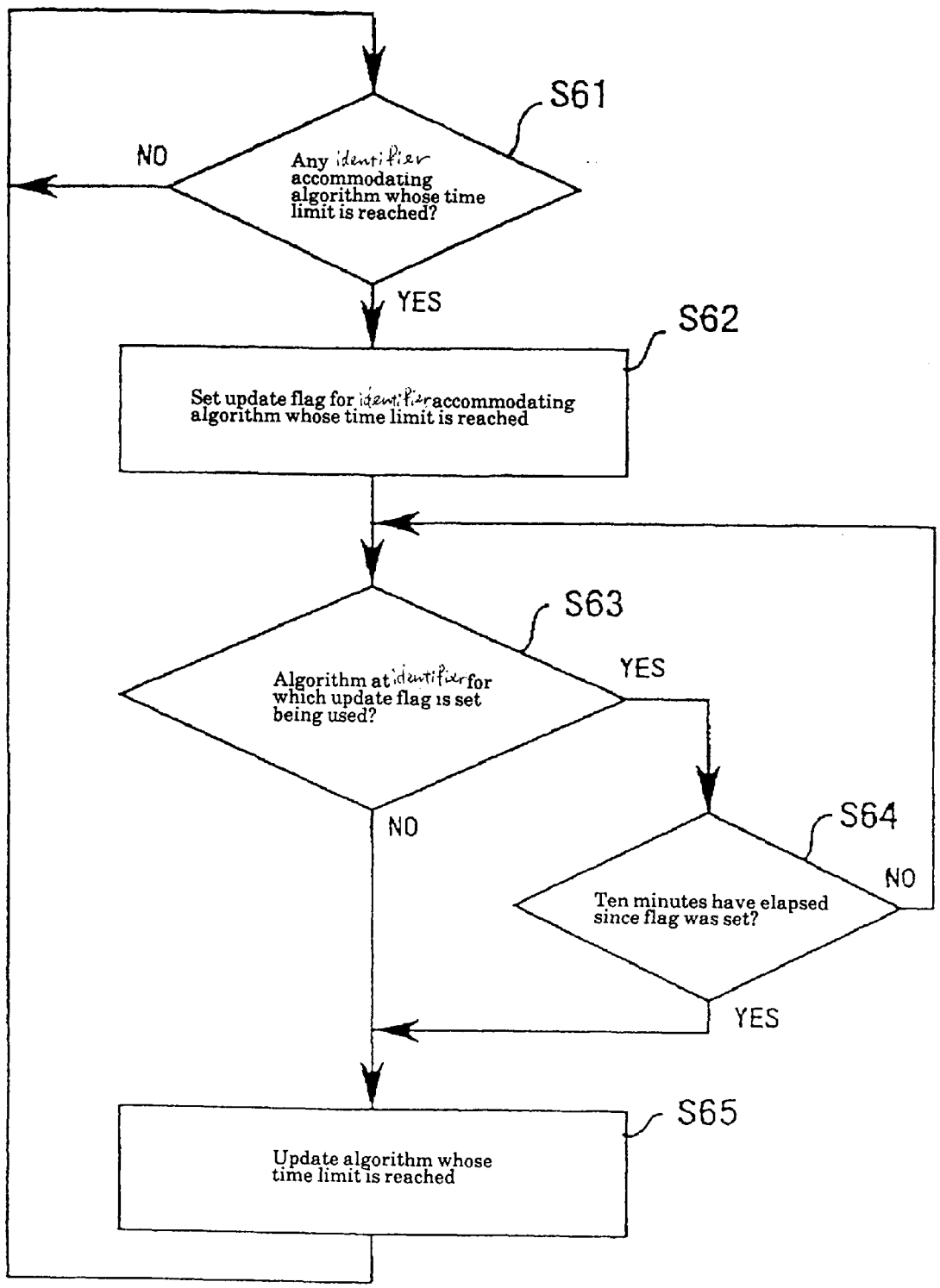
FIG. 30 is a flowchart of steps in which an algorithm is forcibly updated.

FIG. 30 is a flowchart of steps in which an algorithm is forcibly updated. In this example, a key is updated forcibly for any algorithm within 10 minutes of its update flag being set.

In step S61, a check is made to see if there is any identifier accommodating an algorithm whose time limit is reached. If such an algorithm is detected, step S62 is reached. If no such algorithm is found, step S61 is repeated until such an algorithm is detected.

In step S62, an update flag is set for the identifier accommodating the algorithm whose time limit is reached.

In step S63, a check is made to see if use is being made of the algorithm at the identifier with its update flag being set. If the algorithm in question is found to be in use, step S64 is reached. If the algorithm is not used, step S65 is reached.

In step S64, a check is made to see if 10 minutes have elapsed since the flag was set. If the 10-minute period is found to have expired, step S65 is reached. If the 10 minutes are yet to elapse, step S63 is reached again.

In step S65, the algorithm whose time limit is reached is updated, and step S61 is reached again.

In the manner described, each algorithm whose time limit is reached is forcibly updated even if the re-encryption means has been tampered with and fails to change algorithms. The resulting malfunction of the data processing means keeps data secret in a self-destructive fashion. Although the example above has shown any algorithm to be updated unfailingly within 10 minutes of expiration of its time limit, this is not limitative of the invention. The specific updating cycle may be determined by taking into consideration the use status of the system and the processing capability of the data processing means 1. Instead of resorting to forced updating of algorithms, the system may be reset by generation of an NMI (non-maskable interrupt).

In the examples above, the case in which encryption-decryption keys are changed from time to time has been separated in description from the case where encryption-decryption algorithms are changed over time. Alternatively, keys and algorithms may be changed in combination over time. The processes for key and algorithm modification may be combined suitably to reinforce encryption security further.

When the component means in FIG. 23 are accommodated in a protective housing, data security is enhanced still further.

Figure 31:
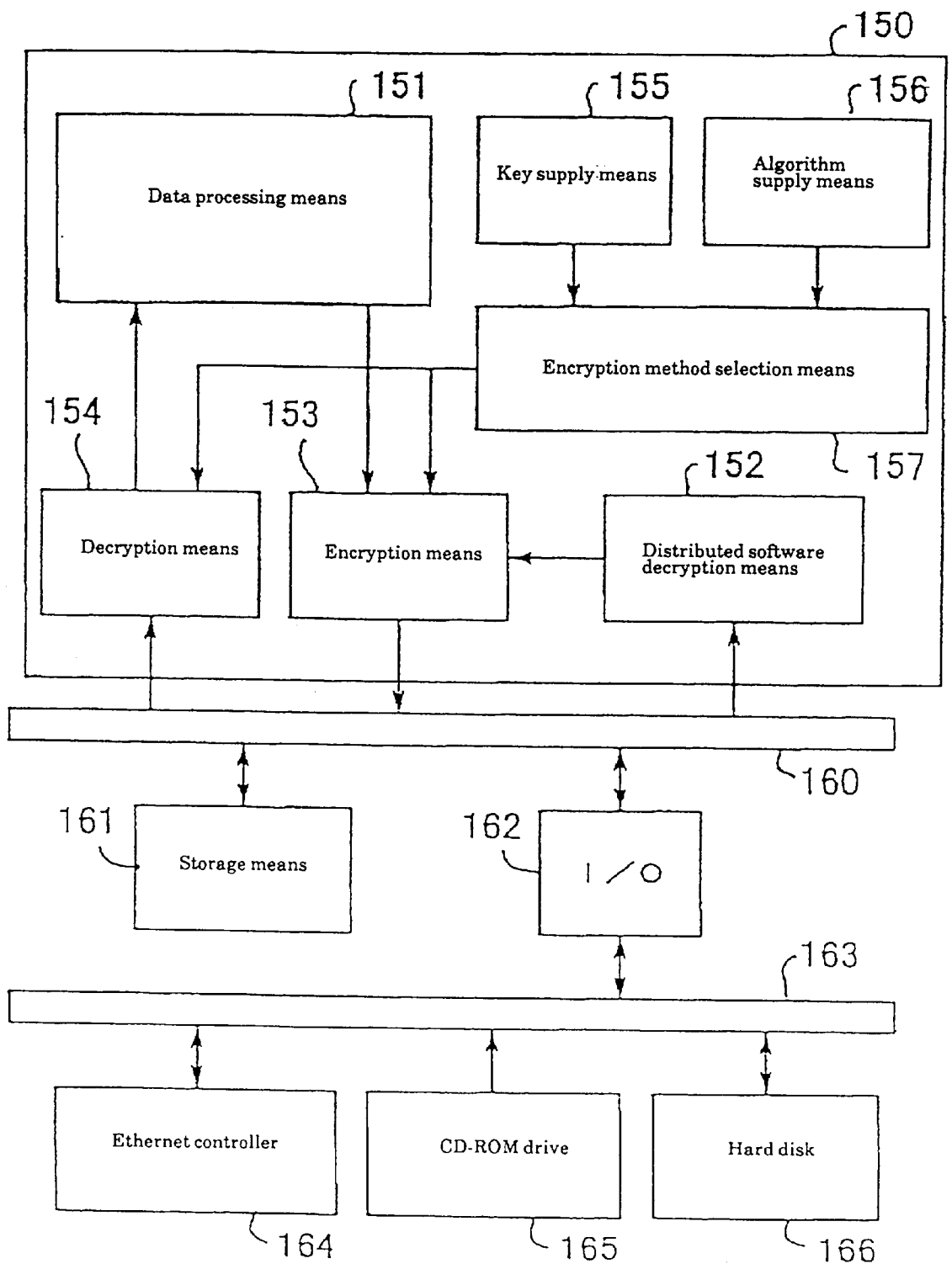
FIG. 31 is a block diagram of a data processing apparatus with software protecting functions, the apparatus having its major components housed in a protective enclosure.
Figure 32:
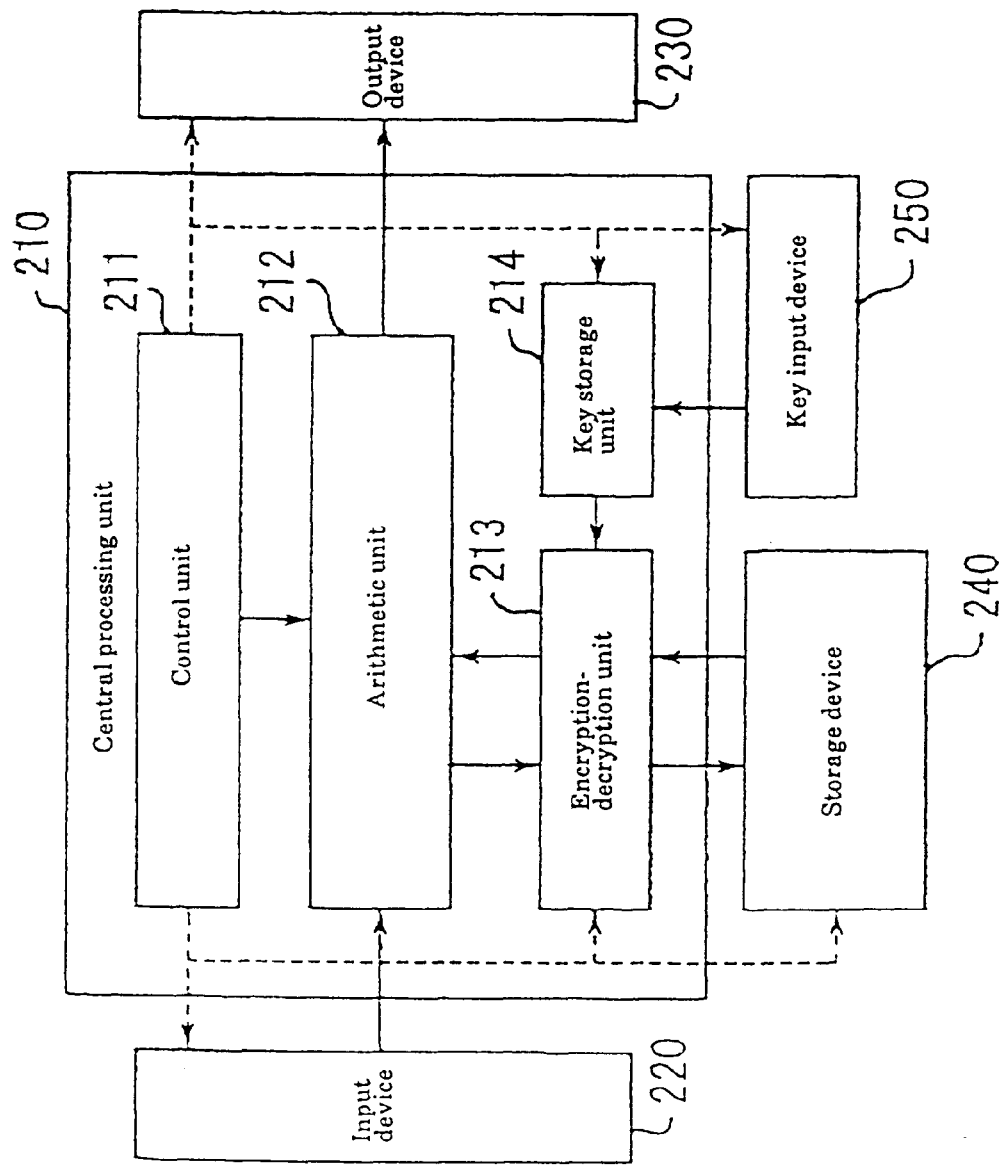
FIG. 32 is a block diagram of a conventional data processing apparatus designed for software protection.

FIG. 31 is a block diagram of a data processing apparatus with software protecting functions, the apparatus having its major components housed in a protective enclosure. The constitution of FIG. 31 is identical to that of FIG. 23 with the exception of a protective enclosure 150 being added. In FIGS. 31 and 23, like reference numerals designate like or corresponding parts, with their descriptions omitted where repetitive. The protective enclosure 150 houses the data processing means 151, distributed software decryption means 152, encryption means 153, decryption means 154, key supply means 155, algorithm supply means 156 and encryption method selection means 157. The protective enclosure 150 is designed to resist externally initiated probes into the components inside. If dismounted or penetrated, the protective enclosure 150 will stop its internal workings and/or erase internal data that are supposed to be confidential. This arrangement provides a virtually inviolable defense against theft or tampering of encryption-decryption algorithms, encryption-decryption keys or decrypted data. The protective enclosure 150 may be constructed illustratively as shown in FIG. 2.

As described and according to the invention, encryption-decryption keys and algorithms are generated in accordance with the attributes of target data for encryption and decryption. Because different encryption-decryption keys and encryption-decryption algorithms are used with respect to different data attributes, encryption security is enhanced independently of the memory management method of the system in question.

While preferred embodiments of the invention have been described using specific terms, such description is for illustrative purposes only, and it is to be understood that changes and variations may be made without departing from the spirit or scope of the following claims.

What is claimed is:

1. A data processing apparatus with software protecting functions based on data encryption and decryption, comprising:

encryption key generation means for generating an encryption key depending on an attribute of data including instructions to be encrypted;

decryption key generation means for generating a decryption key depending on an attribute of encrypted data;

encryption means for encrypting data to be encrypted by use of said encryption key generated by said encryption key generation means;

storage means for storing encrypted data from said encryption means;

decryption means for decrypting said encrypted data in said storage means by use of said decryption key generated by said decryption key generation means;

processing means connected directly to said decryption means so as to process data decrypted by said decryption means in accordance with instructions included in the decrypted data; and control means for outputting processed data from said processing means directly to said encryption means as data to be encrypted.

2. A data processing apparatus with software protecting functions according to claim 1, wherein said encryption key generation means generates said encryption key depending on either an address or an address region of data to be encrypted; and wherein said decryption key generation means generates said decryption key depending on either said address or said address region of the encrypted data.

3. A data processing apparatus with software protecting functions according to claim 1, wherein said storage means has a storage space managed by a virtual storage method;

wherein said encryption key generation means generates said encryption key depending on either a virtual address or a virtual address region of data to be encrypted; and wherein said decryption key generation means generates said decryption key depending on either said virtual address or said virtual address region of the encrypted data.

4. Image processing apparatus with software protecting functions according to claim 1, wherein said storage means has a storage space managed by a paged memory management method;

wherein said encryption key generation means generates said encryption key depending on a page to which data to be encrypted belongs; and wherein said decryption key generation means generates said decryption key depending on the page to which the encrypted data belongs.

5. A data processing apparatus with software protecting functions according to claim 1, wherein said storage means has a storage space managed by a segmented memory management method;

wherein said encryption key generation means generates said encryption key depending on a segment to which data to be encrypted belongs; and wherein said decryption key generation means generates said decryption key depending on the segment to which the encrypted data belongs.

6. A data processing apparatus with software protecting functions according to claim 1, wherein said storage means has a storage space managed by a multiple virtual storage method;

wherein said encryption key generation means generates said encryption key depending on a virtual storage space to which data to be encrypted belongs; and wherein said decryption key generation means generates said decryption key depending on the virtual storage space to which the encrypted data belongs.

7. A data processing apparatus with software protecting functions according to claim 1, wherein said processing means performs processing in units of processes;

wherein said encryption key generation means generates said encryption key depending on a process to which data to be encrypted belongs; and wherein said decryption key generation means generates said decryption key depending on the process to which the encrypted data belongs.

8. A data processing apparatus with software protecting functions according to claim 1, wherein said encryption key generation means generates said encryption key by use of data to be encrypted regarded as an attribute; and wherein said decryption key generation means generates said decryption key by use of the encrypted data regarded as the attribute of the encrypted data.

9. A data processing apparatus with software protecting functions according to claim 1, further comprising security means for deleting data for controlling processing functions in the event of an externally applied physical action on an inclusive body including said encryption key generation means, said decryption key generation means, said encryption means, said decryption means, said processing means and said control means;

wherein said encryption means encrypts data processed by said security means and outputs the encrypted data from said inclusive body; and wherein said decryption means retrieves encrypted data from said storage means and places the retrieved data into said inclusive body for decryption.

10. A data processing apparatus with software protecting functions according to claim 1, further comprising distributed data decryption means for decrypting encrypted data which has been input and for which a decryption key and a decryption algorithm have been specified, said distributed data decryption means further inputting the decrypted data to said encryption means as data to be encrypted.

11. A data processing apparatus with software protecting functions according to claim 1, wherein said encryption key generation means manages a plurality of encryption keys as encryption key groups and selects an encryption key group depending on an attribute of a plurality of data to be encrypted;

wherein said decryption key generation means manages a plurality of decryption keys as decryption key groups and selects a decryption key group depending on the attribute of the plurality of encrypted data;

wherein said encryption means encrypts individually a plurality of data to be encrypted by use of individual encryption keys constituting the encryption key group selected by said encryption key generation means; and wherein said decryption means decrypts individually the plurality of encrypted data by use of individual decryption keys constituting the decryption key group selected by said decryption key generation means.

12. A data processing apparatus according to claim 1, further comprising re-encryption command means for outputting a re-encryption command to re-encrypt encrypted data of which the encryption key used upon encryption needs to be changed;

wherein said encryption key generation means, upon receiving said re-encryption command, changes the encryption key corresponding to the attribute of the data to be re-encrypted so as to generate a changed encryption key;

wherein said decryption key generation means, upon receiving said re-encryption command, generates a decryption key depending on the attribute of the data to be re-encrypted and, when the re-encrypted data are all decrypted, changes the decryption key corresponding to the attribute of the re-encrypted data;

wherein said decryption means decrypts the re-encrypted data by use of the decryption key generated by said decryption key generation means; and wherein said encryption means encrypts the decrypted re-encrypted data by use of the encryption key generated by said encryption key generation means.

13. A data processing apparatus with software protecting functions according to claim 12, wherein said re-encryption command means manages effective periods of encryption keys, said re-encryption command means further outputting a re-encryption command to re-encrypt data when the effective period of the encryption key by which said data was encrypted has expired.

14. A data processing apparatus with software protecting functions based on data encryption and decryption, comprising:

an encryption key generation circuit for generating an encryption key depending on an attribute of data including instructions to be encrypted;

a decryption key generation circuit for generating a decryption key depending on an attribute of encrypted data;

an encryption circuit for encrypting data to be encrypted by use of said encryption key generated by said encryption key generation circuit;

a memory for storing encrypted data from said encryption circuit;

a decryption circuit for decrypting said encrypted data in said memory by use of said decryption key generated by said decryption key generation circuit;

an MPU connected directly to said decryption circuit so as to process data decrypted by said decryption circuit in accordance with instructions included in the decrypted data; and a control circuit for outputting processed data from said processing circuit directly to said encryption circuit as data to be encrypted.

15. A data processing apparatus with software protecting functions according to claim 14, wherein said encryption key generation circuit generates said encryption key depending on either an address or an address region of data to be encrypted; and wherein said decryption key generation circuit generates said decryption key depending on either said address or said address region of the encrypted data.

16. A data processing apparatus with software protecting functions based on data encryption and decryption, comprising:

key supply means for supplying a plurality of keys used for encryption and decryption;

algorithm supply means for supplying a plurality of pieces of algorithm information expressing algorithms for encryption and decryption;

encryption-decryption method selection means for selecting an encryption key and encryption algorithm information respectively from among said plurality of keys and said plurality of pieces of algorithm information supplied for encryption, and selecting a decryption key and decryption algorithm information respectively from among said plurality of keys and said plurality of pieces of algorithm information supplied for decryption;

encryption means for encrypting data to be encrypted by use of the encryption key and encryption algorithm information selected by said encryption-decryption method selection means;

storage means for storing encrypted data from said encryption means;

decryption means for decrypting said encrypted data in said storage means by use of the decryption key and decryption algorithm information selected by said encryption-decryption method selection means;

processing means connected directly to said decryption means so as to process data decrypted by said decryption means in accordance with instructions included in the decrypted data; and control means for outputting processed data from said processing means directly to said encryption means as data to be encrypted.

17. A data processing apparatus with software protecting functions according to claim 16, wherein said encryption-decryption method selection means changes from time to time and in accordance with a predetermined manner, the combination of the encryption key and encryption algorithm information selected upon encryption, and the combination of the decryption key and decryption algorithm information selected upon decryption.

18. A data processing apparatus with software protecting functions according to claim 16, wherein said algorithm supply means changes the contents of the algorithm information it supplies from time to time and in accordance with a predetermined manner.

19. A data processing apparatus with software protecting functions according to claim 18, wherein said algorithm supply means manages effective periods of the algorithm information it supplies, said algorithm supply means further substituting new algorithm information for the algorithm information supplied beyond the effective period thereof.

* * * * *